(12) United States Patent
Singer

(10) Patent No.: US 10,124,836 B2
(45) Date of Patent: *Nov. 13, 2018

(54) MEGA ELONGATOR

(71) Applicant: Nicholas J. Singer, Irvine, CA (US)

(72) Inventor: Nicholas J. Singer, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/721,315

(22) Filed: Sep. 29, 2017

(65) Prior Publication Data

US 2018/0057076 A1    Mar. 1, 2018

Related U.S. Application Data

(63) Continuation of application No. 15/629,643, filed on Jun. 21, 2017, which is a continuation-in-part of
(Continued)

(51) Int. Cl.
| | |
|---|---|
| *B62D 33/027* | (2006.01) |
| *B62D 33/08* | (2006.01) |
| *B62D 33/03* | (2006.01) |
| *B62D 21/14* | (2006.01) |
| *B60R 19/38* | (2006.01) |
| *B60R 19/32* | (2006.01) |
| *B60R 19/48* | (2006.01) |
| *B60P 3/40* | (2006.01) |
| *B62D 33/023* | (2006.01) |

(52) U.S. Cl.
CPC .......... *B62D 33/0273* (2013.01); *B60R 19/32* (2013.01); *B60R 19/38* (2013.01); *B60R 19/48* (2013.01); *B62D 21/14* (2013.01); *B62D 33/03* (2013.01); *B62D 33/08* (2013.01); *B60P 3/40* (2013.01); *B62D 33/023* (2013.01)

(58) Field of Classification Search
CPC .... B62D 33/0273; B62D 33/08; B62D 33/03; B62D 21/14; B60R 19/38; B60R 19/32; B60P 3/40
See application file for complete search history.

(56) References Cited

U.S. PATENT DOCUMENTS

| | | | |
|---|---|---|---|
| 2,490,014 A | 12/1949 | Villiers | |
| 2,872,239 A | 2/1959 | Bowness et al. | |
| | (Continued) | | |

FOREIGN PATENT DOCUMENTS

| | | |
|---|---|---|
| CA | 1244858 A1 | 11/1988 |
| DE | 814244 C | 9/1951 |

OTHER PUBLICATIONS

Hyundai, Santa Cruz Crossover Truck Concept (image), published at least as early as Jan. 2015.

*Primary Examiner* — Joseph D. Pape
*Assistant Examiner* — Dana D Ivey
(74) *Attorney, Agent, or Firm* — Klein, O'Neill & Singh, LLP

(57) ABSTRACT

A replacement tailgate for the purpose of elongating the pick up truck may be installed on a truck bed wherein the replacement tailgate can be unfolded in order to elongate a length of the truck bed. The replacement tailgate may have front and rear shells that are used to support objects placed in the truck bed as well as act as the new tailgate when the truck bed length is elongated. Various panels may be unfolded in order to trap objects within the truck bed when the replacement tailgate is unfolded in order to elongate the truck bed length.

10 Claims, 38 Drawing Sheets

Related U.S. Application Data application No. 15/414,346, filed on Jan. 24, 2017, now Pat. No. 9,789,913, which is a continuation-in-part of application No. 15/238,577, filed on Aug. 16, 2016, now Pat. No. 9,592,860, which is a continuation-in-part of application No. 14/959,259, filed on Dec. 4, 2015, now Pat. No. 9,452,782.

(56) References Cited

U.S. PATENT DOCUMENTS

| | | |
|---|---|---|
| 4,472,639 A | 9/1984 | Bianchi |
| 4,531,773 A | 7/1985 | Smith |
| 4,596,417 A | 6/1986 | Bennett |
| 5,154,470 A | 10/1992 | Bringman, Jr. |
| 5,244,335 A | 9/1993 | Johns |
| 5,456,511 A | 10/1995 | Webber |
| 5,468,038 A | 11/1995 | Sauri |
| 5,669,654 A | 9/1997 | Eilers et al. |
| 5,755,480 A | 5/1998 | Bryan |
| 5,775,759 A | 7/1998 | Cummins |
| 5,788,311 A | 8/1998 | Tibbals |
| 5,857,724 A | 1/1999 | Jarman |
| 5,924,753 A | 7/1999 | DiBassie |
| 5,997,066 A | 12/1999 | Scott |
| 6,019,410 A | 2/2000 | Trostle et al. |
| 6,179,360 B1 | 1/2001 | Davian |
| 6,193,294 B1 | 2/2001 | Disner et al. |
| 6,279,980 B1 | 8/2001 | Straschewski |
| 6,340,190 B1 | 1/2002 | Rosebrugh et al. |
| 6,367,858 B1 | 4/2002 | Bradford |
| 6,378,926 B1 | 4/2002 | Renze et al. |
| 6,422,630 B1 | 7/2002 | Heaviside |
| 6,513,850 B1 | 2/2003 | Reed |
| 6,550,841 B1 | 4/2003 | Burdon et al. |
| 6,676,182 B2 | 1/2004 | Fitts |
| D504,384 S | 4/2005 | Straschewski |
| 6,908,134 B1 | 6/2005 | Summers |
| 6,918,624 B2 | 7/2005 | Miller et al. |
| 6,994,363 B2 | 2/2006 | Seksaria et al. |
| 7,021,689 B1 | 4/2006 | Weisbeck, III |
| 7,111,886 B1 | 9/2006 | Miller |
| 7,204,537 B1 | 4/2007 | Oh et al. |
| 7,488,021 B1 | 2/2009 | Roos |
| 7,967,356 B2 * | 6/2011 | Stackpole .......... B62D 33/0273 224/402 |
| 8,109,552 B2 | 2/2012 | Nelson |
| 8,182,012 B1 | 5/2012 | Brister |
| 9,409,608 B2 | 8/2016 | Waskie |
| 9,452,782 B1 | 9/2016 | Singer |
| 9,592,860 B1 | 3/2017 | Singer |
| 9,789,913 B2 | 10/2017 | Singer |
| 9,862,429 B2 | 1/2018 | Castillo et al. |
| 2002/0000732 A1 | 1/2002 | Sanders |
| 2002/0105201 A1 | 8/2002 | Melotik |
| 2002/0140244 A1 | 10/2002 | Kuhn et al. |
| 2003/0141733 A1 | 7/2003 | Burg |
| 2006/0214449 A1 | 9/2006 | Klusmeier |
| 2010/0078955 A1 | 4/2010 | Smith |
| 2012/0228893 A1 | 9/2012 | Lu et al. |
| 2017/0036872 A1 | 2/2017 | Wallace et al. |
| 2017/0158254 A1 | 6/2017 | Singer |
| 2017/0282979 A1 | 10/2017 | Singer |

* cited by examiner

MEGA ELONGATOR

CROSS-REFERENCE TO RELATED APPLICATIONS

This is a continuation application of U.S. patent application Ser. No. 15/629,643, filed on Jun. 21, 2017, which is a continuation in part application of U.S. patent application Ser. No. 15/414,346, filed on Jan. 24, 2017, which is a continuation in part application of U.S. patent application Ser. No. 15/238,577, filed on Aug. 16, 2016, which is a continuation in part application of U.S. patent application Ser. No. 14/959,259, filed on Dec. 4, 2015, now U.S. Pat. No. 9,452,782, the entire contents of which is expressly incorporated herein by reference.

STATEMENT RE: FEDERALLY SPONSORED RESEARCH/DEVELOPMENT

Not Applicable

BACKGROUND

The various embodiments and aspects described herein relate to an accessory for a truck bed to elongate a length of the truck bed.

Trucks have beds that come in a variety of sizes. By way of example and not limitation, the truck beds may be a short bed or long bed. The short bed may serve the purposes of its owner a majority of the time but at certain times, the owner may require a slightly longer truck bed to haul larger or longer objects. In this regard, the owner may let down his or her tailgate and allow the objects to hang out of the back side of the truck bed when hauling the long object. In doing so, the object becomes a safety hazard in that other vehicles and pedestrians may not see the elongated object hanging out of the truck bed and may inadvertently hit the object causing injury to the person and/or damage to the object.

Additionally, the objects configuration may not be conducive to easily tying the object down in the truck bed. The tailgate is typically lifted upward in order to trap the object within the truck bed so that even if the object slides in the truck bed, the object would still remain within the truck bed.

Accordingly, there is a need in the art for an accessory for a truck bed.

BRIEF SUMMARY

A pick up truck elongator in the form of the tailgate is disclosed herein. The factory tailgate may be replaced with a replacement tailgate that can be pivoted downward to elongate the length of the factory truck bed. The replacement tailgate has a front shell that can be pivoted upward to function as the new tailgate when a rear shell of the replacement tailgate acts as the support to elongate the length of the factory truck bed. Left and right side panels may be unfolded in order to form an enclosure with left and right side walls of the truck bed. Additionally, the rear shell can be fabricated from first and second telescoping panels that allow the user to further expand the factory truck bed.

Alternatively, the original tailgate or replacement tailgate may act as the support to elongate the length of the factory truck bed. Side panels are tucked away in the cavity adjacent a rear side of the left and right truck side bed walls. The panels are folded out and engaged to the upper surface of the tailgate in order to retain objects placed in the truck bed within the truck bed.

More particularly, a tailgate for a bed of a truck is disclosed. The tailgate may comprise a rear shell, a front shell, left and right side panels and left and right latches. The rear shell may be sized and configured to fit between left and right sidewalls of the truck bed. The rear shell may be pivotally attached to a lower rear edge of the truck bed. The front shell may be pivotally attached to an upper edge of the rear shell. The front shell may be pivoted greater than 180 when the front shell is disposed generally parallel to the rear shell. The left and right side panels may be pivotally attached to left and right side portions of the front shell. The left and right latches may be attached to the left and right side panels and the left and right sidewalls of the truck bed to mitigate unwanted movement of the rear shell, front shell and the left and right panels during forward movement of the truck.

The rear shell may comprise first and second telescoping panels for elongating a length of the bed of the truck. The first and second telescoping panels may be attached to each other as a tongue and groove connection.

The tailgate may further comprise left and right elongating side panels which may be pivotally attached to respective ones of the left and right side panels. The left and right latches may be attached to the left and right elongating side panels and the left and right side walls of the truck bed for securing the left and right side panels and the left and right elongating side panels to the left and right side walls of the truck bed.

The rear shell, front shell, left and right side panels may be fabricated from carbon fiber, aluminum, fiberglass, plastic or steel.

The front shell may be pivoted to an angle of about 270 degrees to allow the front shell to hang down when loading and unloading the truck bed.

The left and right latches may be removably attached to left and right standard latch receivers of the truck bed.

The tailgate may further comprise a cover for a pivot joint between the front and rear shells.

In another aspect, a method of elongating a bed length of a truck is disclosed. The method may comprise the steps of providing a tailgate for a bed of a truck and pivotally attaching a lower edge of the rear shell to the lower rear edge of the truck bed. In the providing step of the method, the tailgate may comprise a rear shell, a front shell, left and right side panels and left and right latches. The rear shell may be sized and configured to fit between left and right sidewalls of the truck bed. The rear shell may be pivotally attached to a lower rear edge of the truck bed. The front shell may be pivotally attached to an upper edge of the rear shell. The front shell may be pivoted greater than 180 degrees when the front shell is disposed generally parallel to the rear shell. The left and right side panels may be pivotally attached to left and right side portions of the front shell. The left and right latches may be attached to the left and right side panels and the left and right sidewalls of the truck bed to mitigate unwanted movement of the rear shell, front shell and the left and right panels during forward movement of the truck.

The method may further comprise the step of rotating the tailgate so that the front and rear shells are generally parallel to a ground. The method may also further comprise the steps of rotating the front shell about an upper edge of the rear shell so that the front and rear shells are about 90 degrees from each other; rotating the left and right side panels toward the left and right sidewalls of the truck bed; and securing the left and right side panels to the left and right sidewalls of the truck bed with the left and right latches.

The method may also further comprise the steps of elongating telescoping first and second panels of the front shell to elongate a length of the truck bed; pivoting left and right elongating side panels from the left and right side panels; and securing the left and right elongating side panels to the left and right sidewalls of the truck bed with the left and right latches.

In another aspect, a tailgate extender for a bed of a truck is disclosed. The tailgate extender may comprise first, second and third driver-side vertical panels and first, second and third passenger-side vertical panels.

The first driver side vertical panel may be pivotally attached to a driver side sidewall of the bed of the truck. The second driver side vertical panel may be pivotally attached to the first driver side vertical panel. The third driver side vertical panels may be pivotally attached to the second driver side vertical panel. The first, second and third driver side vertical panels may be stacked adjacent to each other and disposed in a cavity formed at a rear inner portion of the driver side sidewall of the bed of the truck. The first driver side vertical panel may be pivoted so as to be parallel to a driver side edge of the tailgate. The second and third driver side vertical panels may be pivoted so as to be parallel to a back edge of the tailgate.

The first passenger side vertical panel may be pivotally attached to a passenger side sidewall of the bed of the truck. The second passenger side vertical panel may be pivotally attached to the first passenger side vertical panel. The third passenger side vertical panels may be pivotally attached to the second passenger side vertical panel. The first, second and third passenger side vertical panels may be stacked adjacent to each other and disposed in a cavity formed at a rear inner portion of the passenger side sidewall of the bed of the truck. The first passenger side vertical panel may be pivoted so as to be parallel to a passenger side edge of the tailgate. The second and third passenger side vertical panel may be pivoted so as to be parallel to a back edge of the tailgate.

The tailgate extender may further comprising a replacement tailgate defining an upper surface with a groove for receiving the second and third driver-side and passenger side vertical panels. The groove may be parallel with the back edge of the replacement tailgate.

The second and third driver side and passenger side vertical panels may have flexible strips at a bottom end of the second and third driver side and passenger side vertical panels which are receivable in the groove formed in the replacement tailgate.

In another aspect, a method of extending a truck bed of a truck is disclosed. The method may comprise the steps of providing driver-side first, second and third vertical panels which are stacked upon each other and disposed in a driver-side cavity formed by a driver-side sidewall of the truck bed; providing a passenger-side first, second and third vertical panels which are stacked upon each other and disposed in a passenger-side cavity formed by a passenger-side sidewall of the truck bed; pivoting a tailgate to an opened position so that an upper surface of the tailgate is generally coplanar with an upper surface of the truck bed; pivoting the driver side first, second and third vertical panels out from the driver side cavity so that the driver side first vertical panel is parallel with a driver side edge of the tailgate; pivoting the passenger side first, second and third vertical panels out from the passenger side cavity so that the passenger side first vertical panel is parallel a passenger side edge of the tailgate; and pivoting the driver side and passenger side second and third vertical panels away from the driver side and passenger side first vertical panels so that the second and third vertical panels are parallel to a back edge of the tailgate.

In the method, the step of pivoting the driver side and passenger side second and third vertical panels away from the driver side and passenger side first vertical panels may include the steps of pivoting the driver side third vertical panel away from the driver side second vertical panel; and pivoting the passenger side third vertical panel away from the passenger side third vertical panel.

In the method, the step of pivoting the driver side and passenger side second and third vertical panels away from the driver side and passenger side first vertical panels may also include the step of disposing weather stripping attached to bottom portions of the driver side and passenger side second and third vertical panels in a groove formed in the upper surface of the tailgate.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
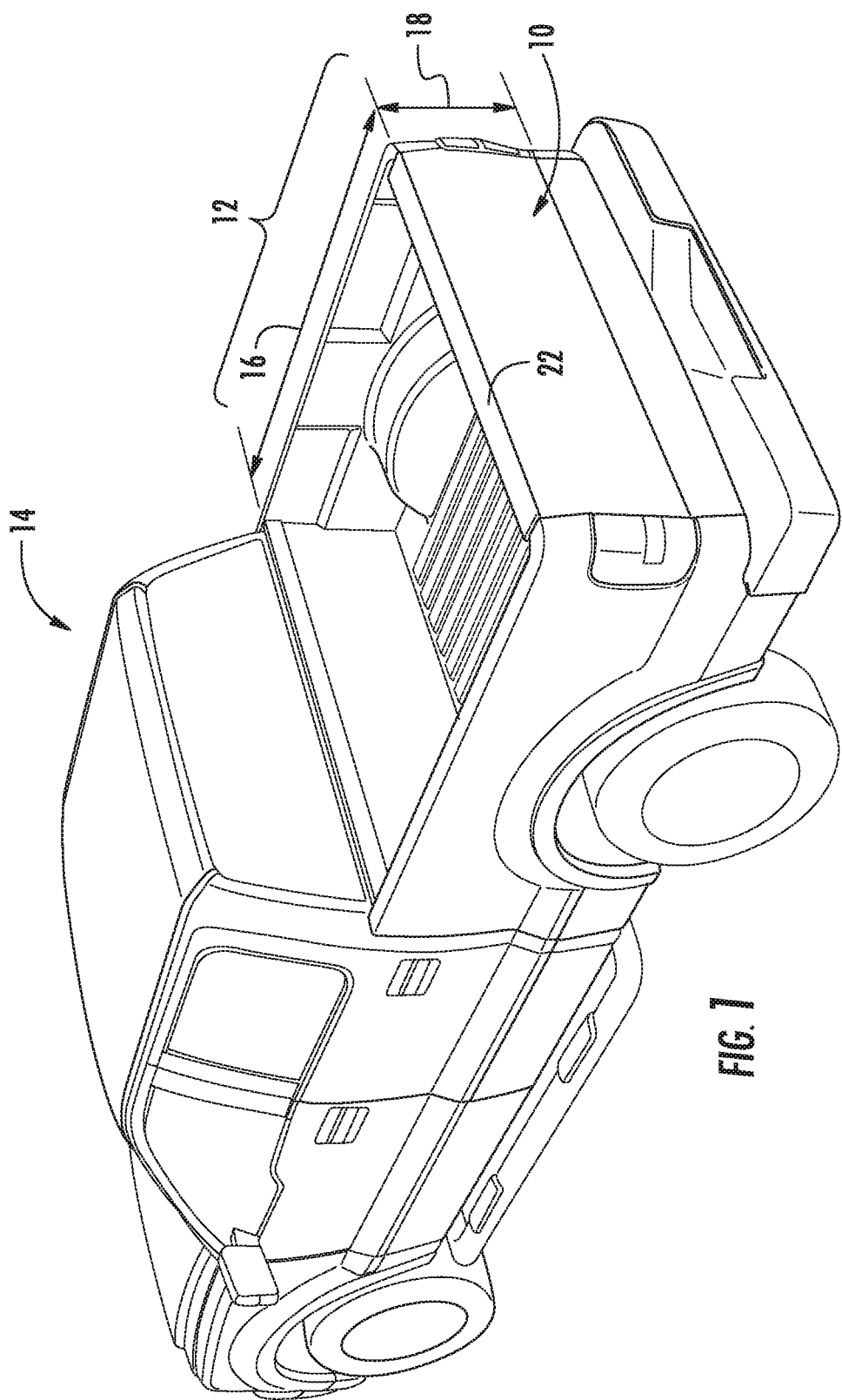
FIG. 1 is a perspective view of a truck with a replacement tailgate installed on a bed of the truck.

Referring now to the drawings, a replacement tailgate 10a for a bed 12 of the truck 14 for the purpose of elongating the pickup truck is shown. The tailgate 10a may replace the factory tailgate and enable the user to elongate the factory length 16 of the truck bed 12 of the truck 14. The tailgate 10a can elongate the factory length 16 of the truck bed 12 about a height 18 of the truck bed 12 or an elongated length 20 (see FIG. 11). The tailgate 10, 10a can also be secured to standard factory latching mechanisms of the factory installed truck bed so that no or little modification to the truck bed 12 is necessary in order to retrofit the truck 14 with the tailgate 10. Alternatively, the factory tailgate may be used to elongate the factory length 16 of the truck bed 12 of the truck 14.

Figure 6:
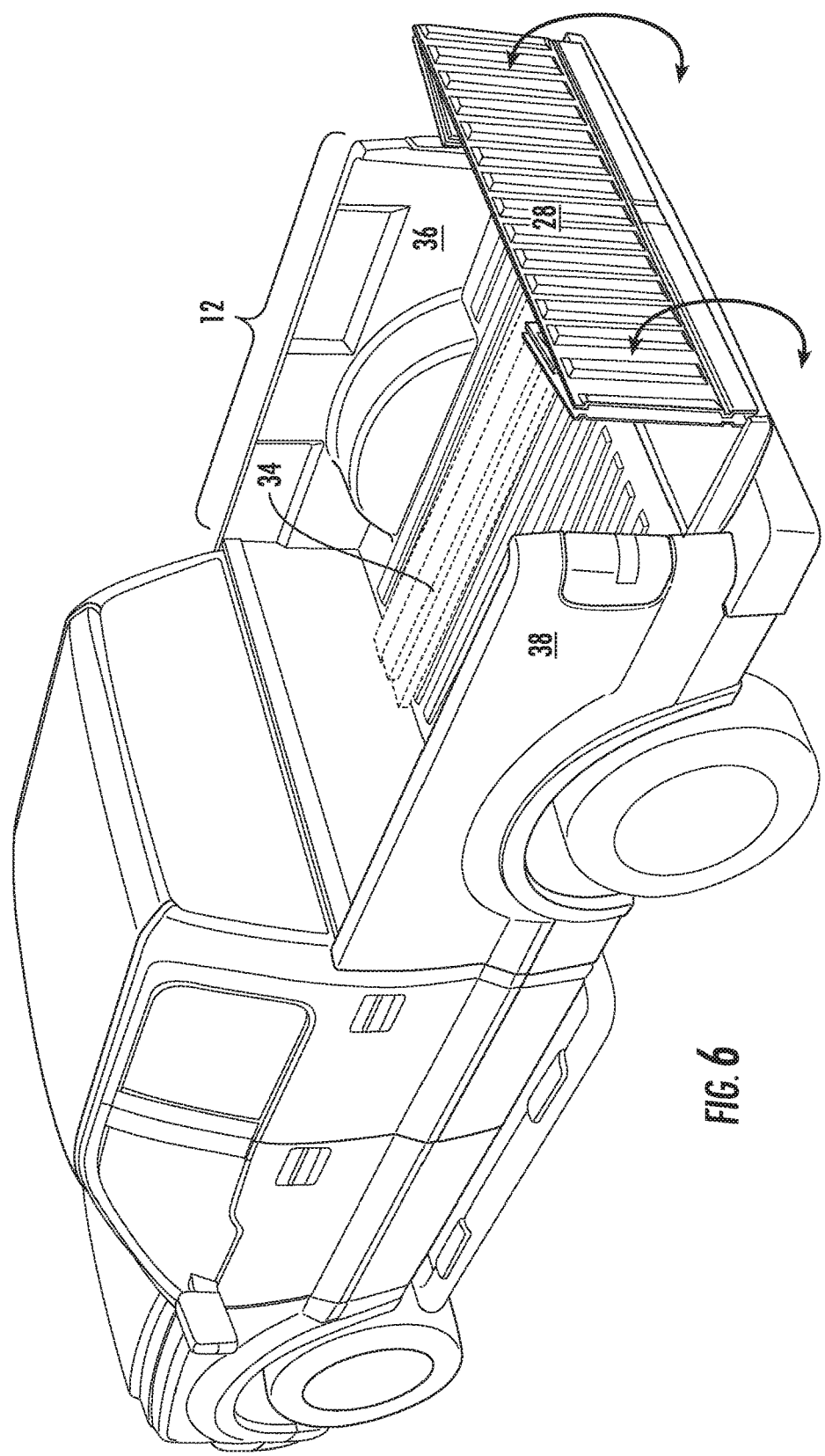
FIG. 6 illustrates the left and right side panels being pivoted outward when the rear shell is 90° with respect to the front shell.
Figure 7:
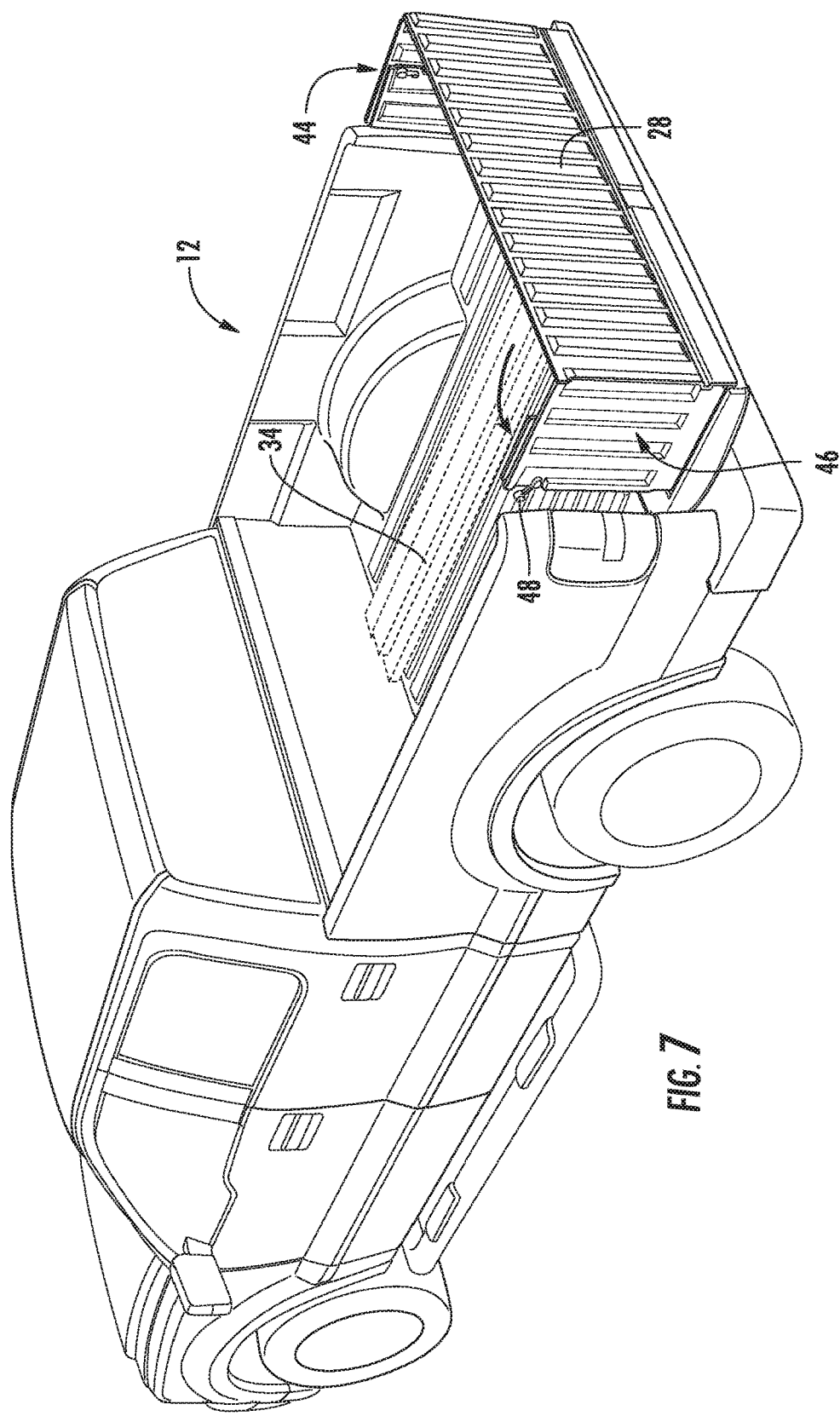
FIG. 7 illustrates the left and right side panels pivoted outward.
Figure 8:
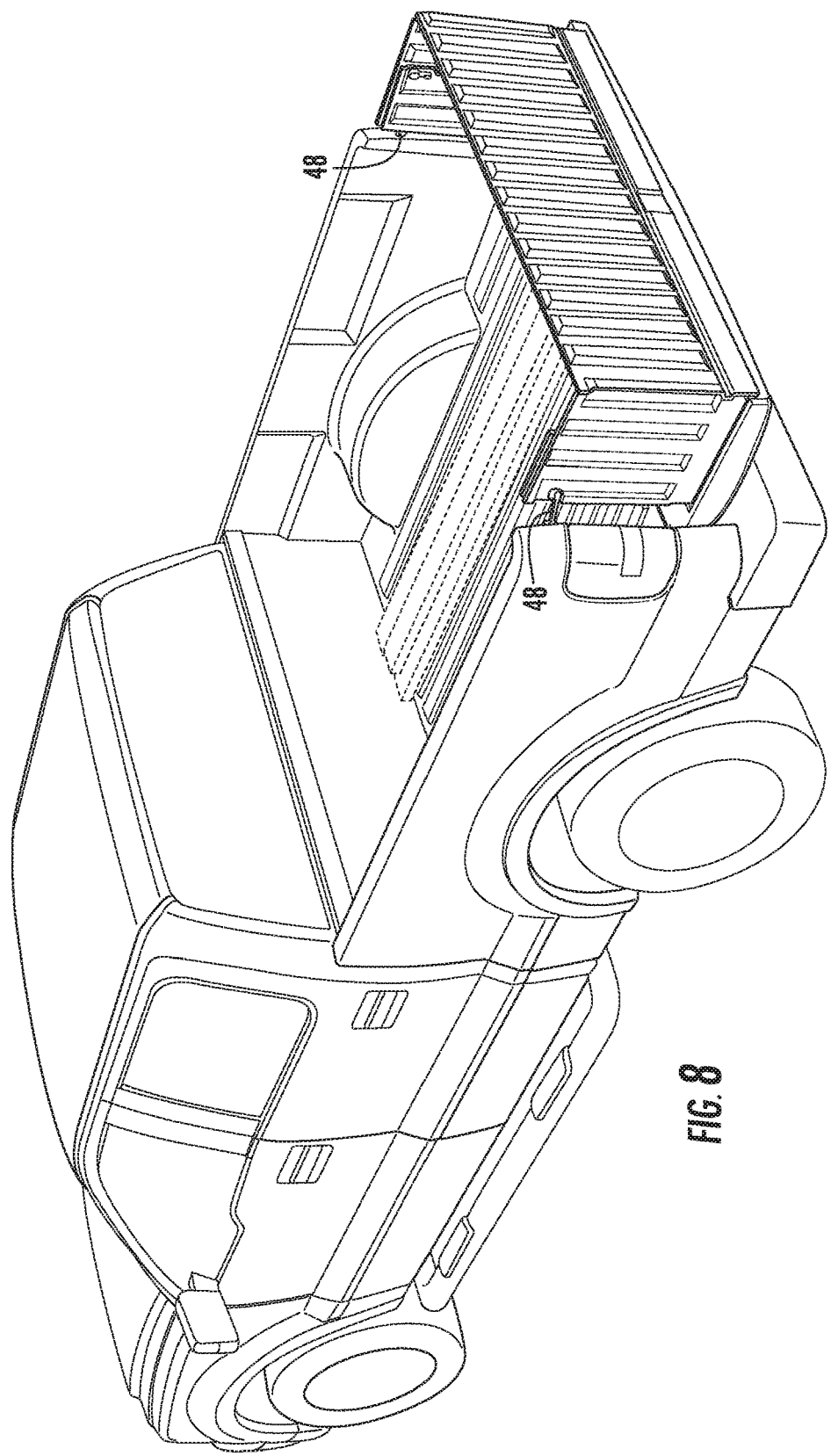
FIG. 8 illustrates latches of the left and right side panels engaging standard latch receivers of the truck bed.
Figure 9:
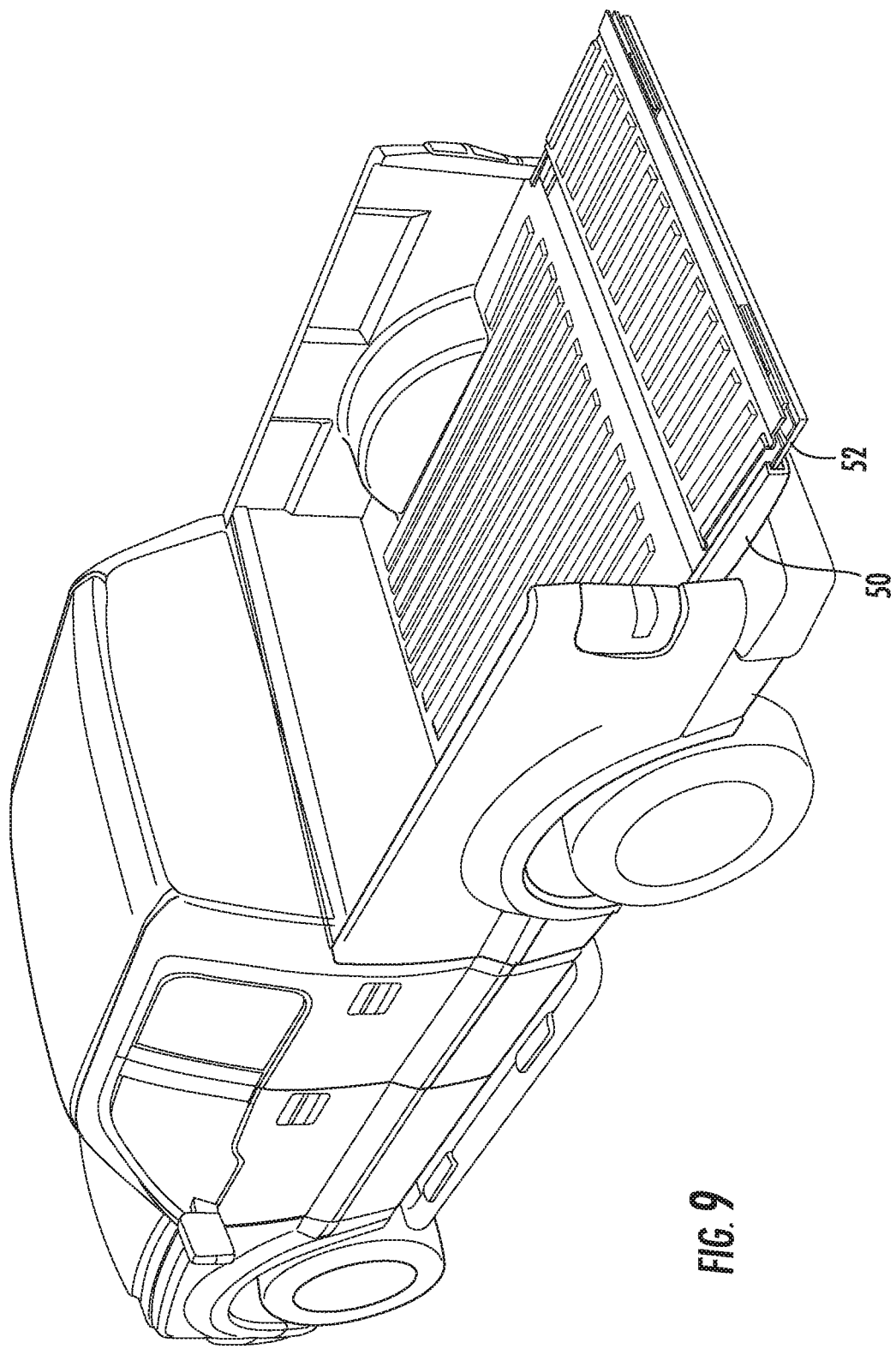
FIG. 9 illustrates first and second telescoping panels of the rear shell.

Referring now the FIGS. 1-8, the tailgate 10 is shown as being deployed to elongate the length 16 of the truck bed 12 to the height 18 of the truck bed 12. In particular, the tailgate 10 has cover 22. The cover 22 is disposed on top of upper ends 24, 26 of front and rear shells 28, 30 of the tailgate 10. The cover 22 prevents objects from being inadvertently disposed between the front and rear shells 28, 30. The front shell 28 functions as the tailgate when the factory length 16 of the truck 12 is elongated by the height 18 of the truck bed 12, as shown in FIG. 8. The rear shell 30 functions as a bottom support for elongating the length 16 so that longer objects 34 can be placed in the truck bed 12 and secured therein by the tailgate 32. Pivoting the cover 22 about the upper end 26 of the rear shell 30 may enable the front shell 28 to be pivoted about the rear shell 30.

Figure 2:
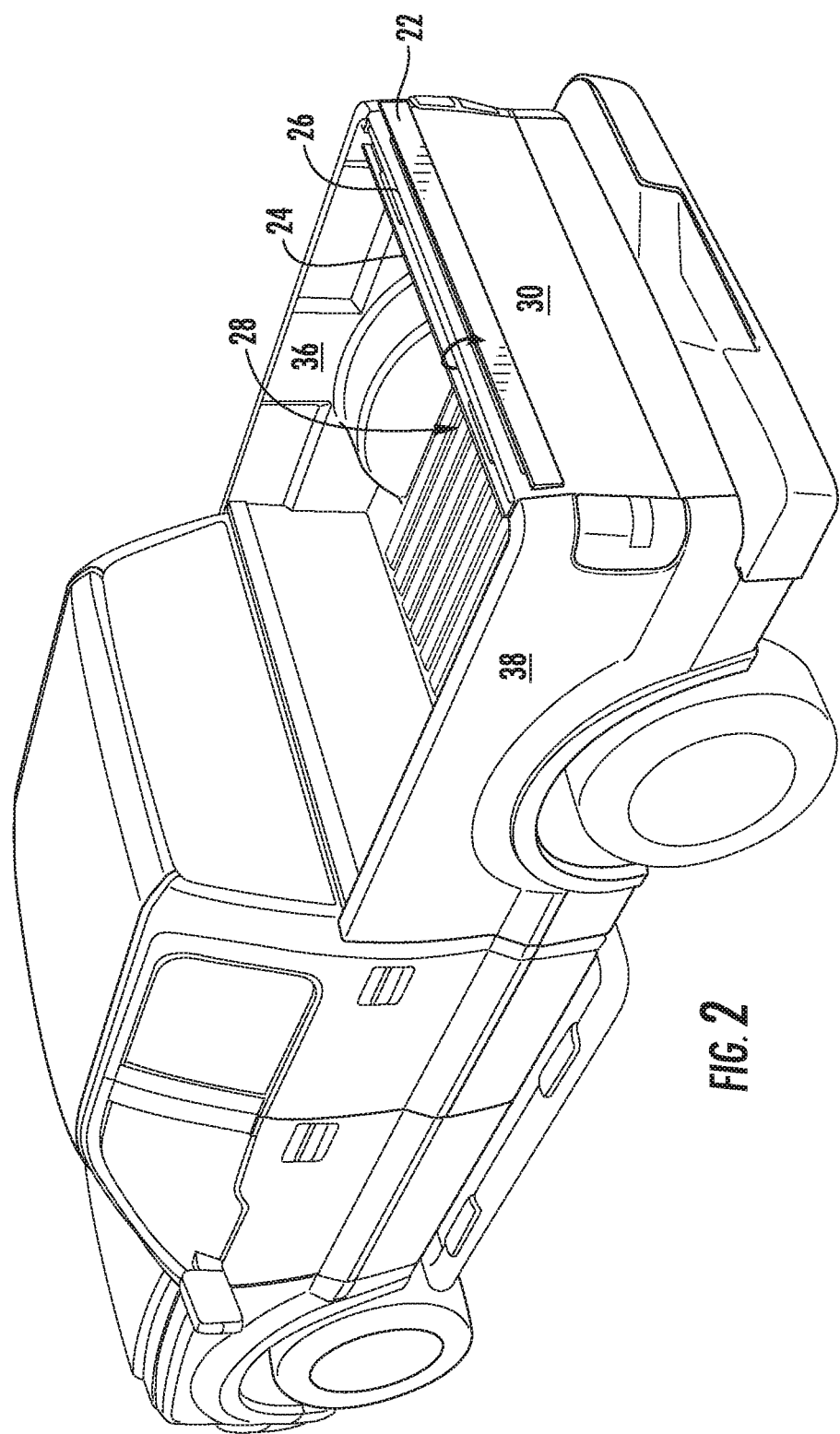
FIG. 2 illustrates a cover of the tailgate shown in FIG. 1 pivoted outward.
Figure 3:
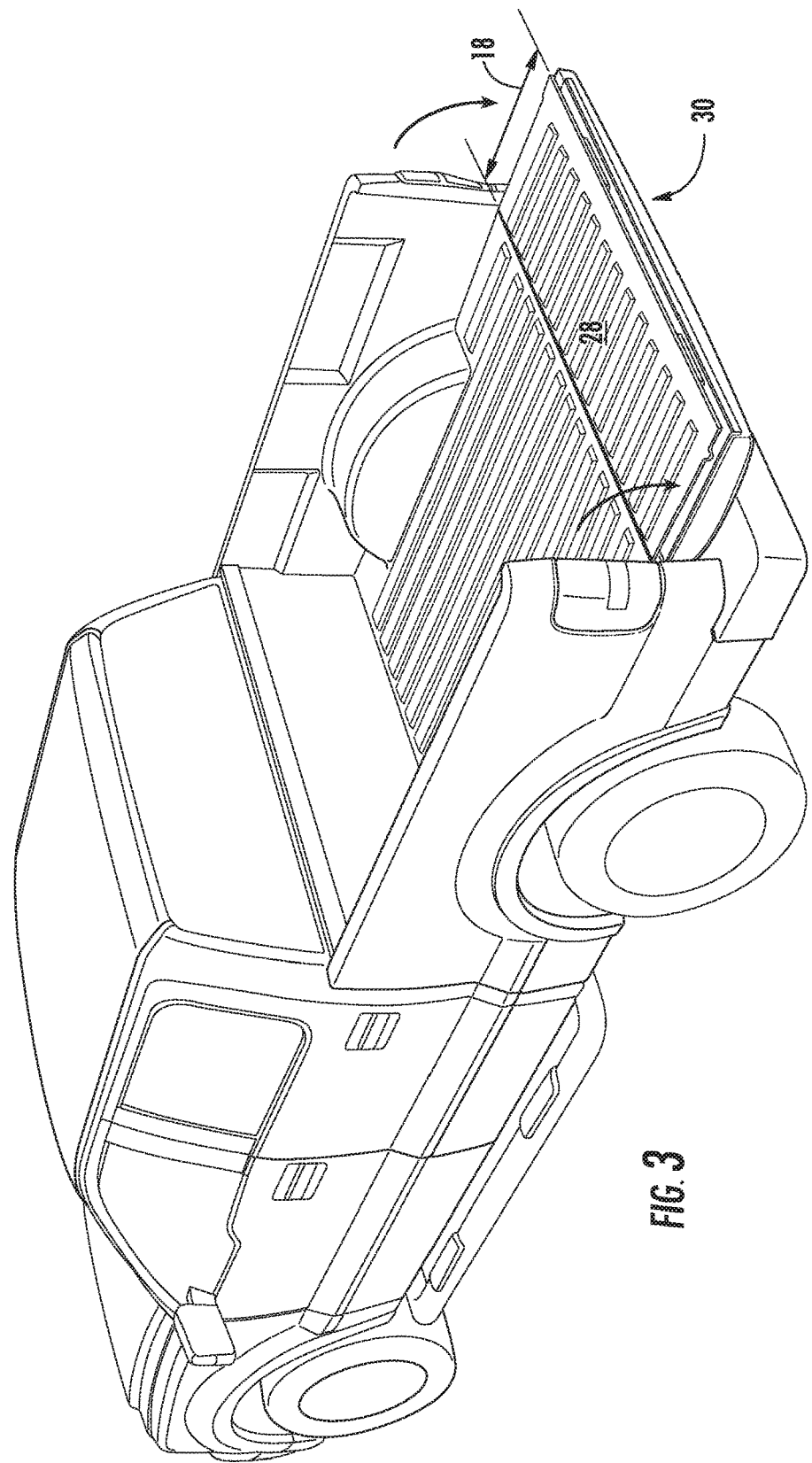
FIG. 3 illustrates the tailgate shown in FIG. 2 pivoted downward.

After pivoting the cover 22 to the open position as shown in FIG. 2, the user may release the tailgate 10 from the left and right side walls 36, 38 to lower the front and rear shells 28, 30 to elongate the factory length 16 of the truck bed 12. As discussed above, the cover 22 may be attached and configured to the tailgate 10 so that pivoting of the cover 22 to the open position enables pivoting of the front shell 28 about the rear shell 30. In this regard, the cover 22 can be pivoted to the open position either before or after the tailgate 10 is traversed to the down position, as shown in FIG. 3. Moreover, it is also contemplated that the ability of the front and rear shells 28, 30 to be pivoted about each other can be independent of the position of the cover 22. The cover 22 can be held in the closed position, as shown in FIG. 1 or in the open position as shown in FIG. 2 with a detent or other latching mechanism.

Figure 4:
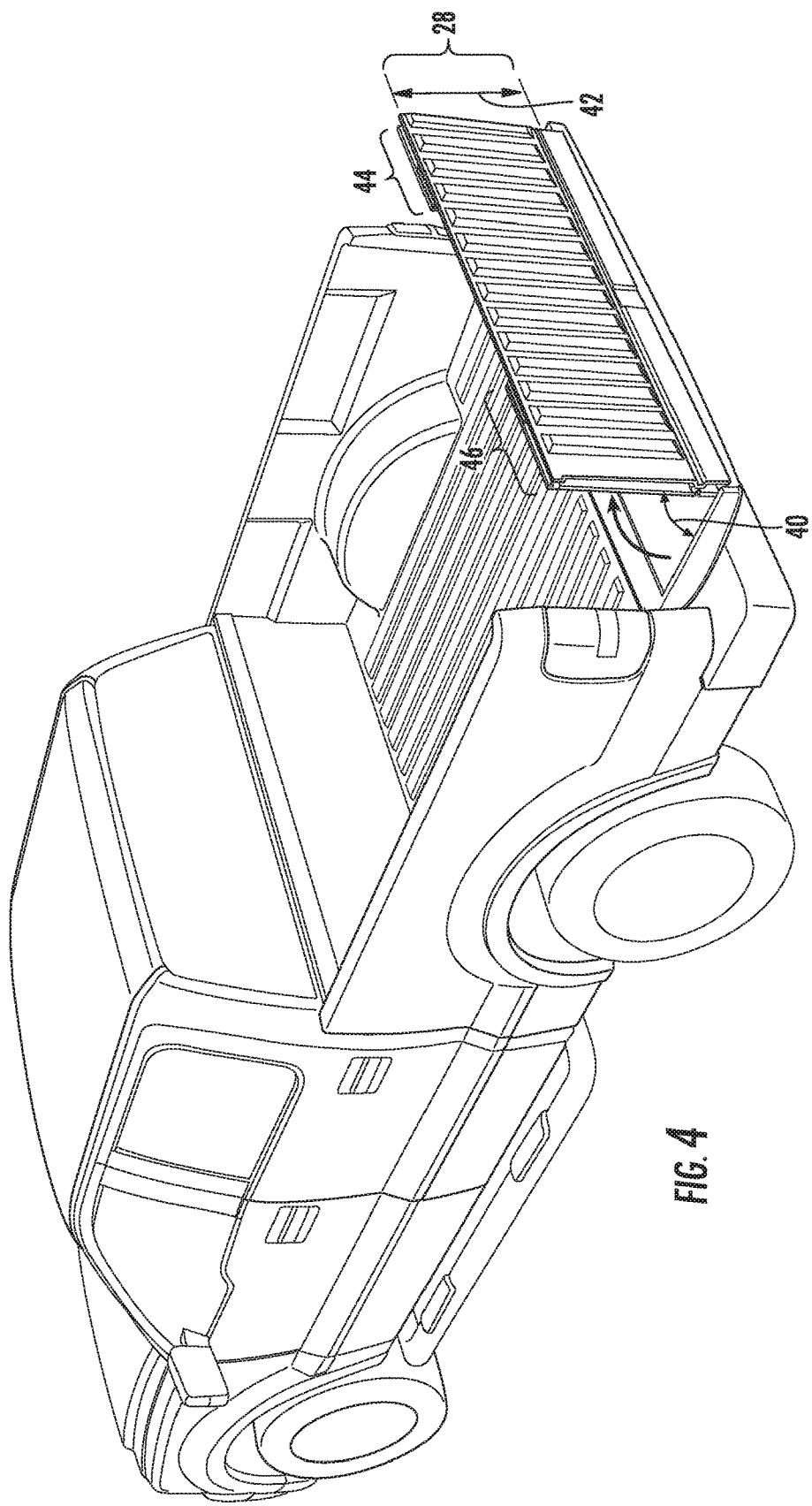
FIG. 4 illustrates a front shell of the tailgate pivoted upward so that the front shell and a rear shell are at a 90° pivoting angle.
Figure 5:
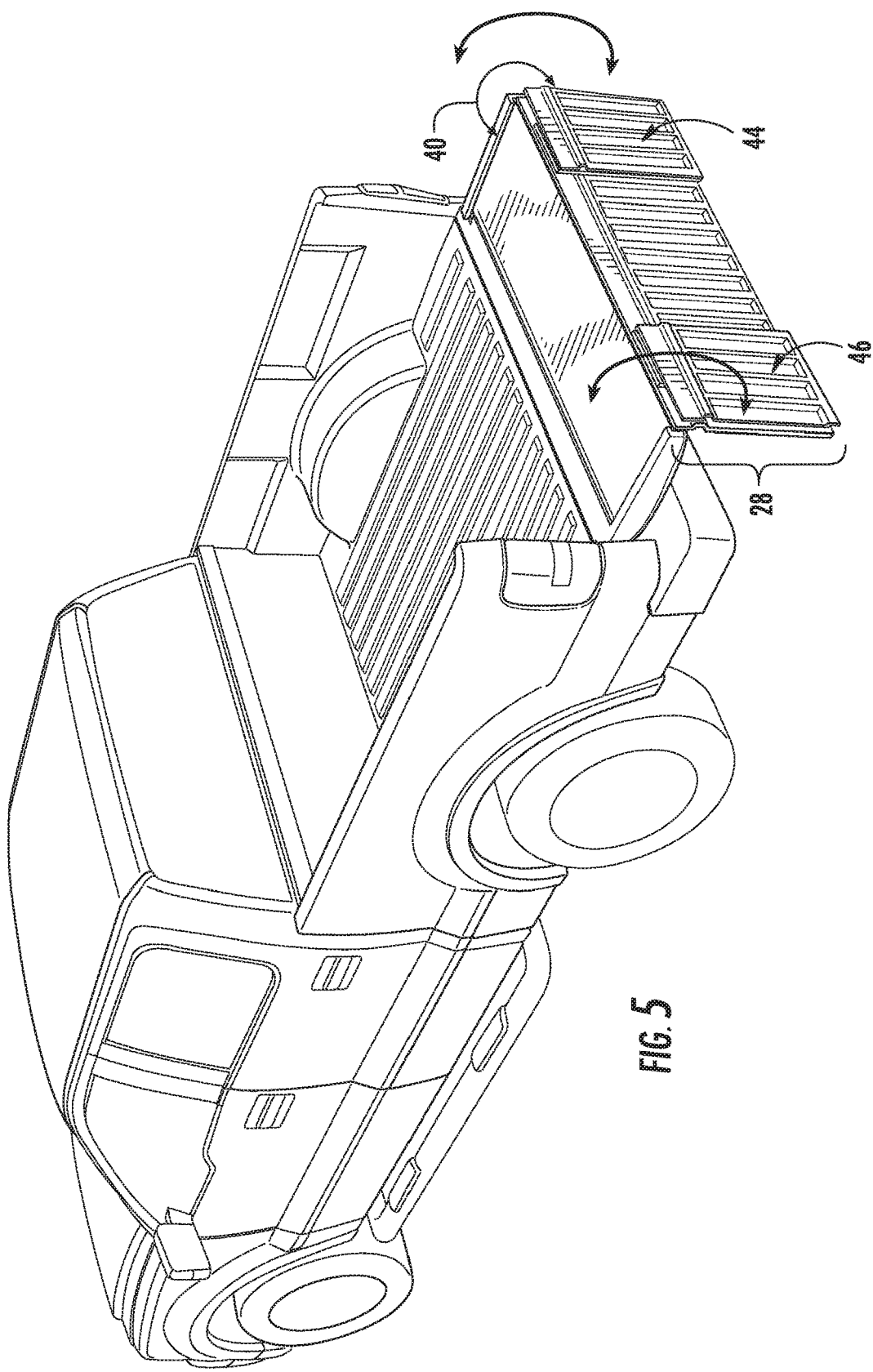
FIG. 5 illustrates the front shell of the tailgate pivoted so that the pivoting angle is at 270° between the front shell and the rear shell.

Once the tailgate 10 is pivoted downward, the front shell 28 can be pivoted upward as shown in FIG. 4. The pivoting angle 40 can be limited to between about 90° and about 270° (see FIG. 5), as shown in FIGS. 4 and 5. The pivoting angle 40 can be limited by way of a detent or other mechanism known in the art or developed in the future. When the front shell 28 is pivoted 270°, the user can slide objects 34 into the bed then lift the front shell 28 upward to trap the objects 34 in the truck bed 12, as shown in FIG. 6.

The front shell 28 may have a height 42 (see FIG. 4) equal to about the height 18 of the tailgate 10. Alternatively, the height 42 of the front shell 28 may be greater than or less than the height 18 but is preferably about equal to the height 18 of the tailgate 10.

As shown in FIG. 7, left and right side panels 44, 46 can be rotated outward and secured to the left and right side walls 36, 38 of the truck bed 12 with the latching mechanism 48. The latching mechanism 48 may be secured to the standard receivers on truck beds so that no or little modification to the truck bed 12 is needed. By securing the latching member 48 to the standard receivers on the truck bed 12, the pivoting angle 40 of the front shell 28 is locked to 90°. Also, the elongated length 20 is set to the height 18 of the tailgate 10. Objects 34 placed within the truck bed 12 remain secured therein by way of the front shell 28 and the left and right side panels 44, 46. The left and right side panels 44, 46 may remain in the un-deployed state as shown in FIGS. 4 and 5. By way of example and not limitation, the left and right side panels 44, 46 and the front shell 28 may have magnets and/or detents that hold the left and right side panels 44, 46 against the front shell 28. Other mechanisms are also contemplated such as detents, latches, etc.

In a further feature, the tailgate 10 may be used to elongate the factory length 16 of the truck bed 12 greater than the height and up to an elongated length 20. To this end, referring now to FIGS. 9-14 the rear shell 30 may be fabricated from telescoping first and second telescoping panels 50, 52. By extending the telescoping first and second panels 50, 52, the truck bed 12 can be elongated by length 54 (see FIG. 10) which is greater than the height 18. The second telescoping panel 52 may be traversed between the retracted position, shown in FIG. 3 or the elongated position, shown in FIG. 10. The second telescoping panel 52 may be retained in the retracted position or elongated position by way of a detent or other mechanism known in the art or developed in the future.

Figure 10:
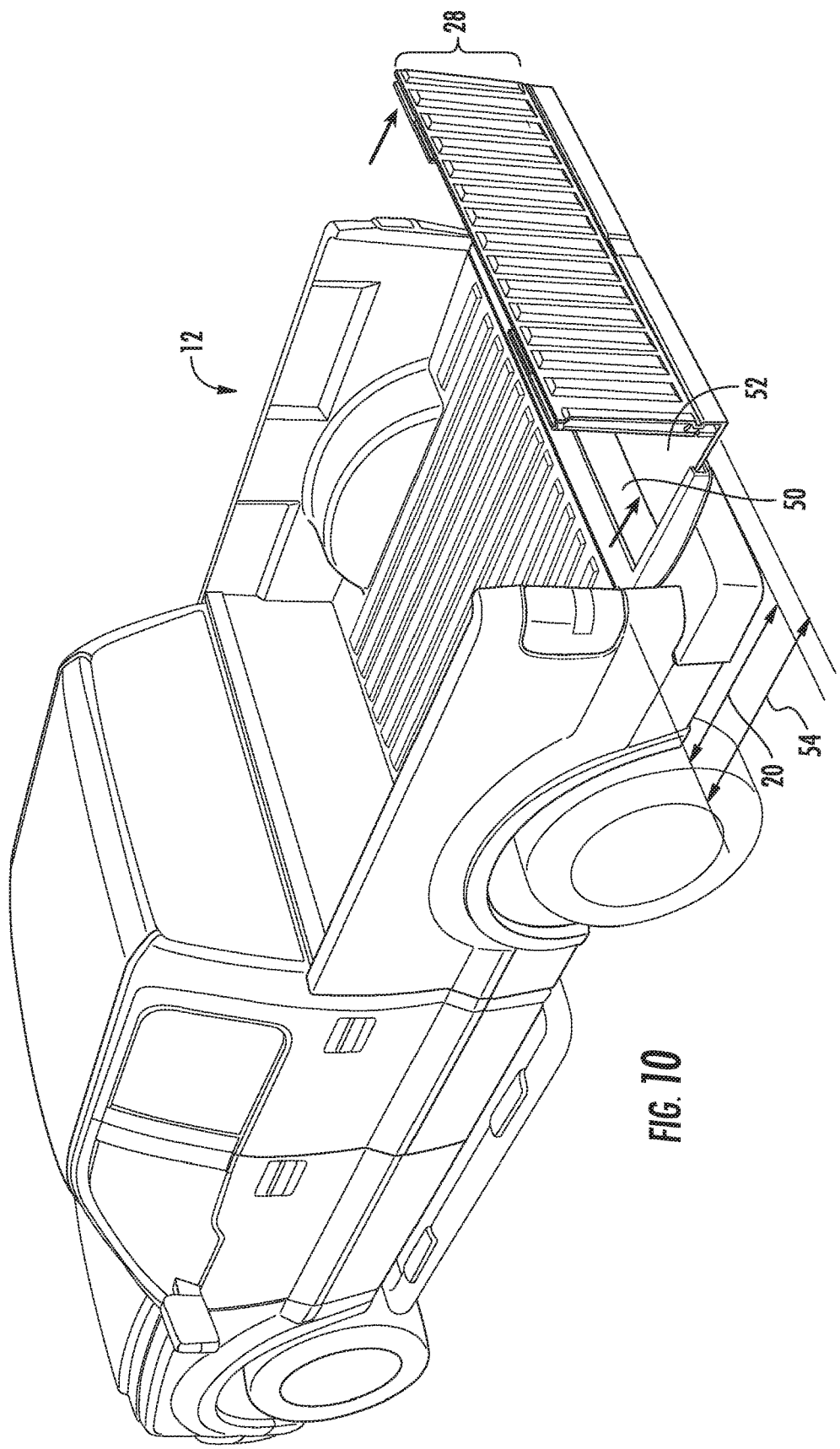
FIG. 10 illustrates the front shell of the tailgate pivoted upward so that the front shell and the rear shell are at a 90° pivoting angle.
Figure 11:
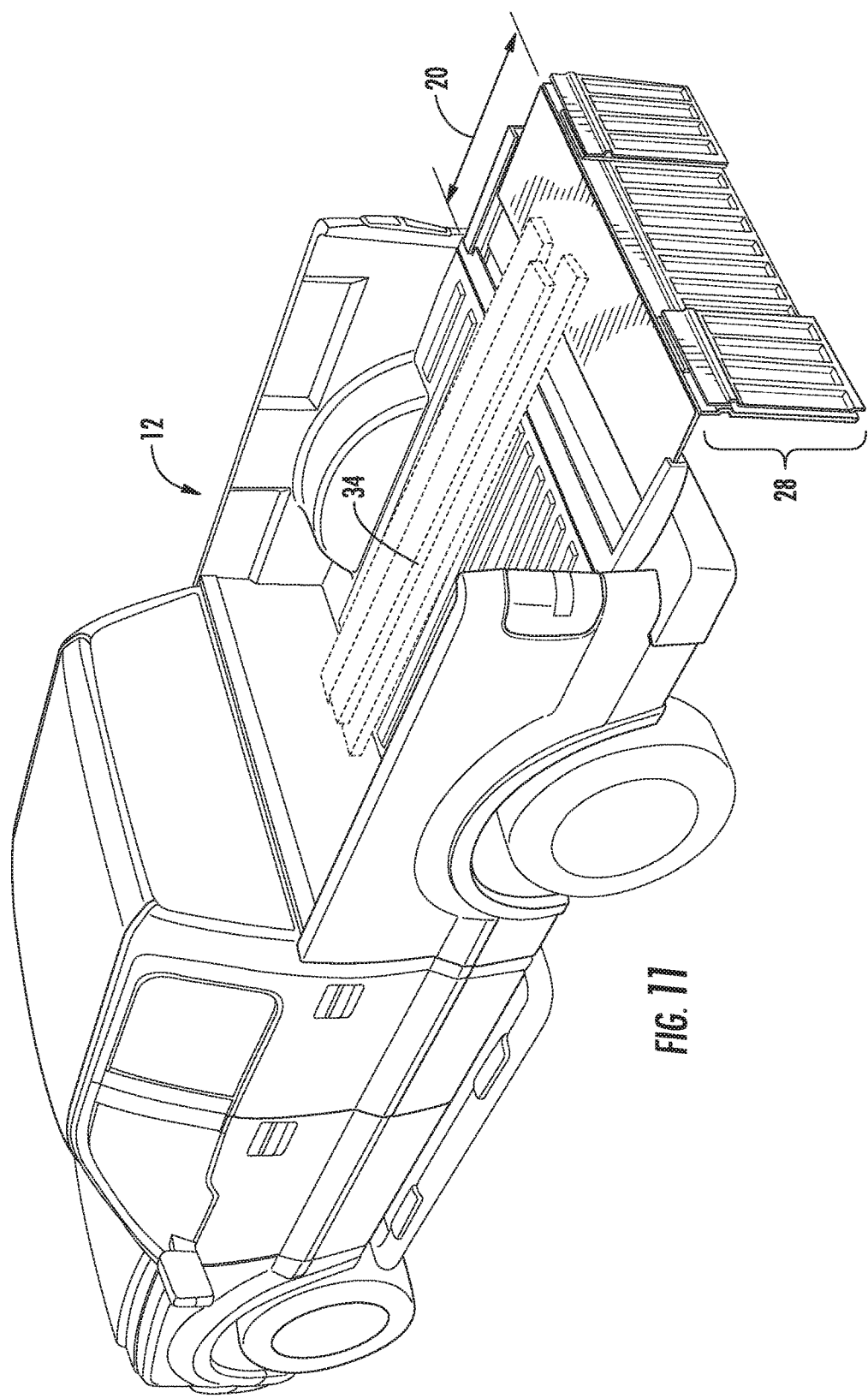
FIG. 11 illustrates the front shell of the tailgate pivoted so that the pivoting angle is about 270° between the front shell and the rear shell.
Figure 12:
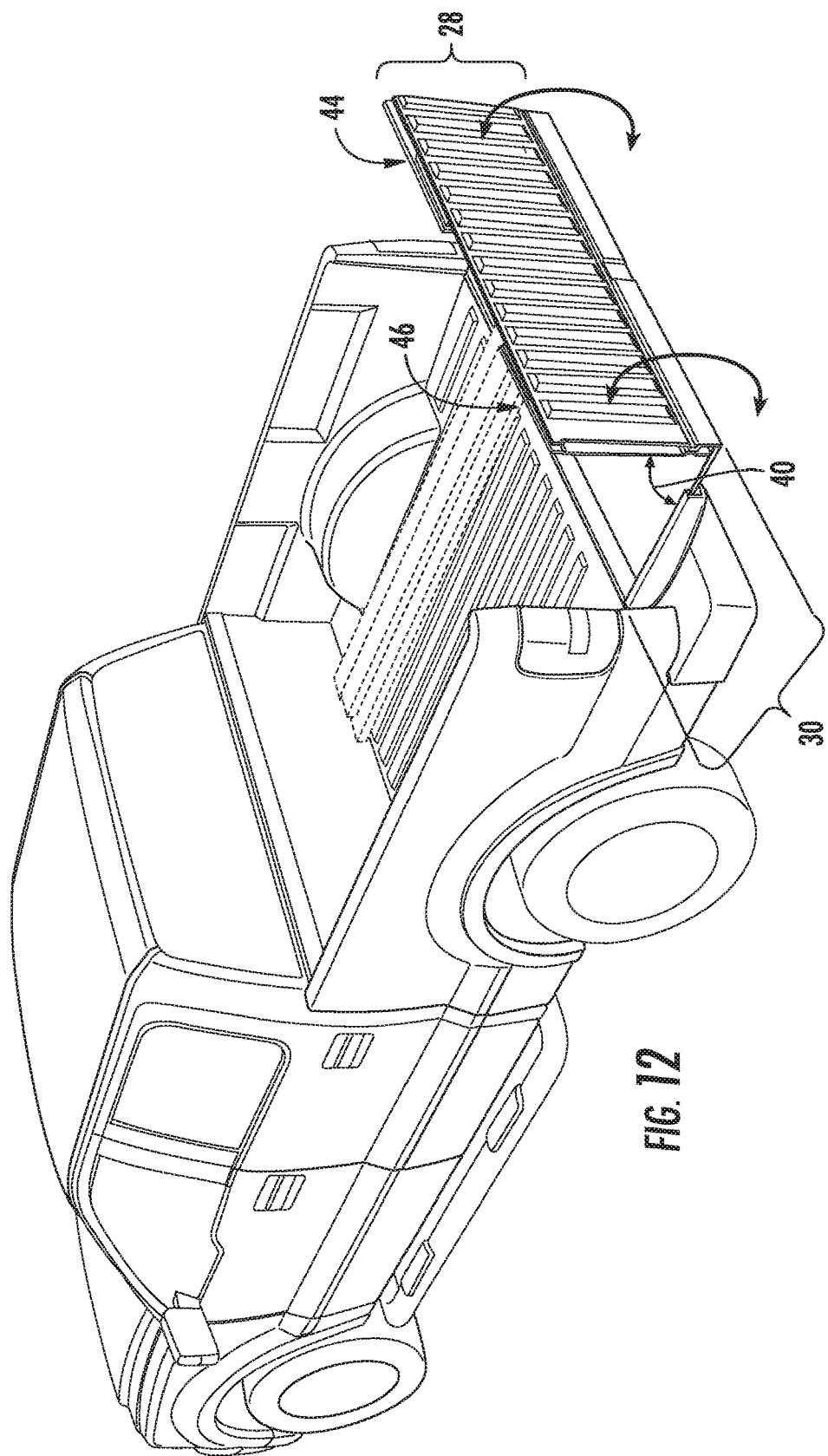
FIG. 12 illustrates the front shell pivoted back to the 90° pivoting angle after objects are placed in the truck bed.
Figure 13:
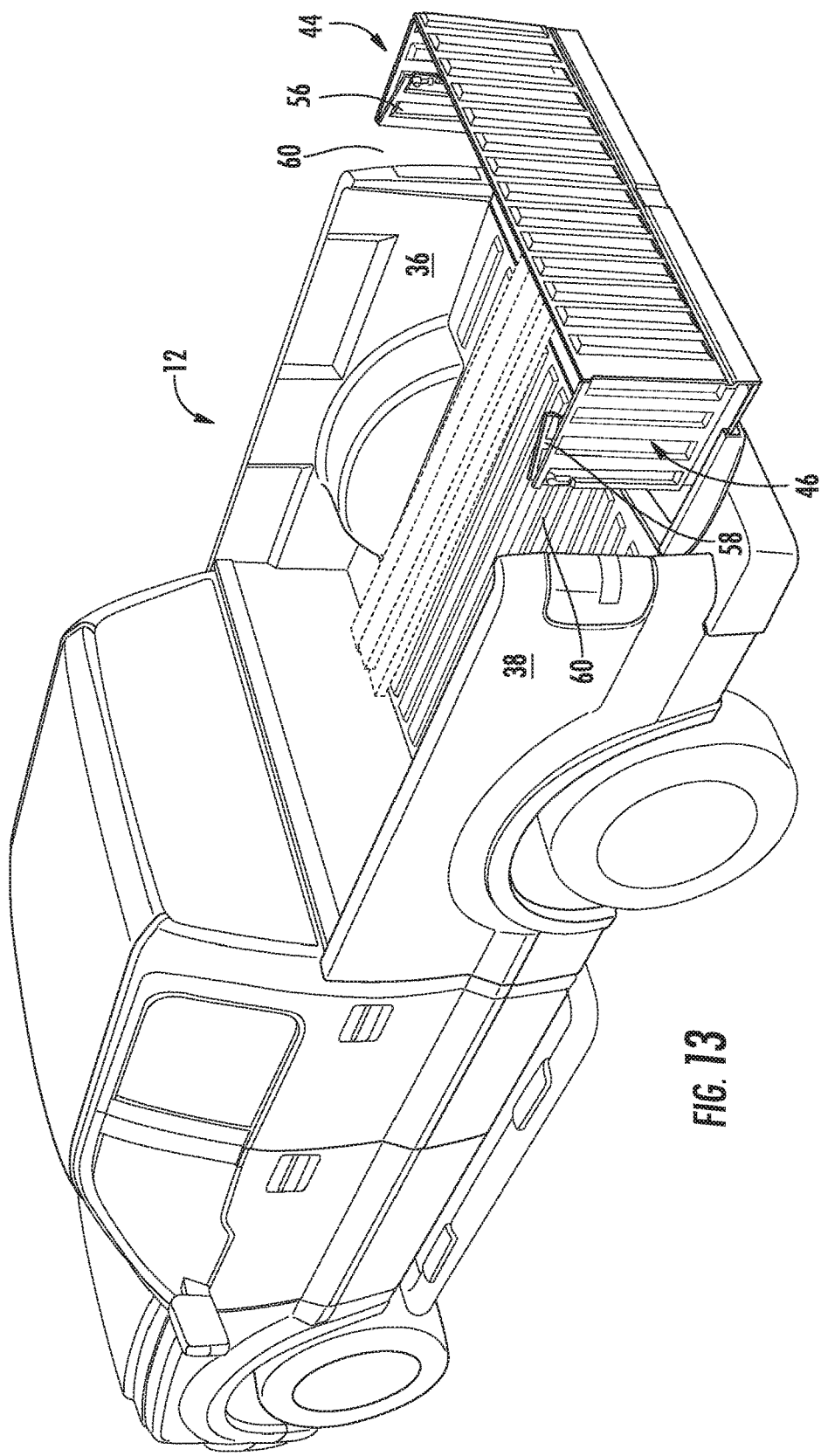
FIG. 13 illustrates the left and right side panels being pivoted outward.
Figure 14:
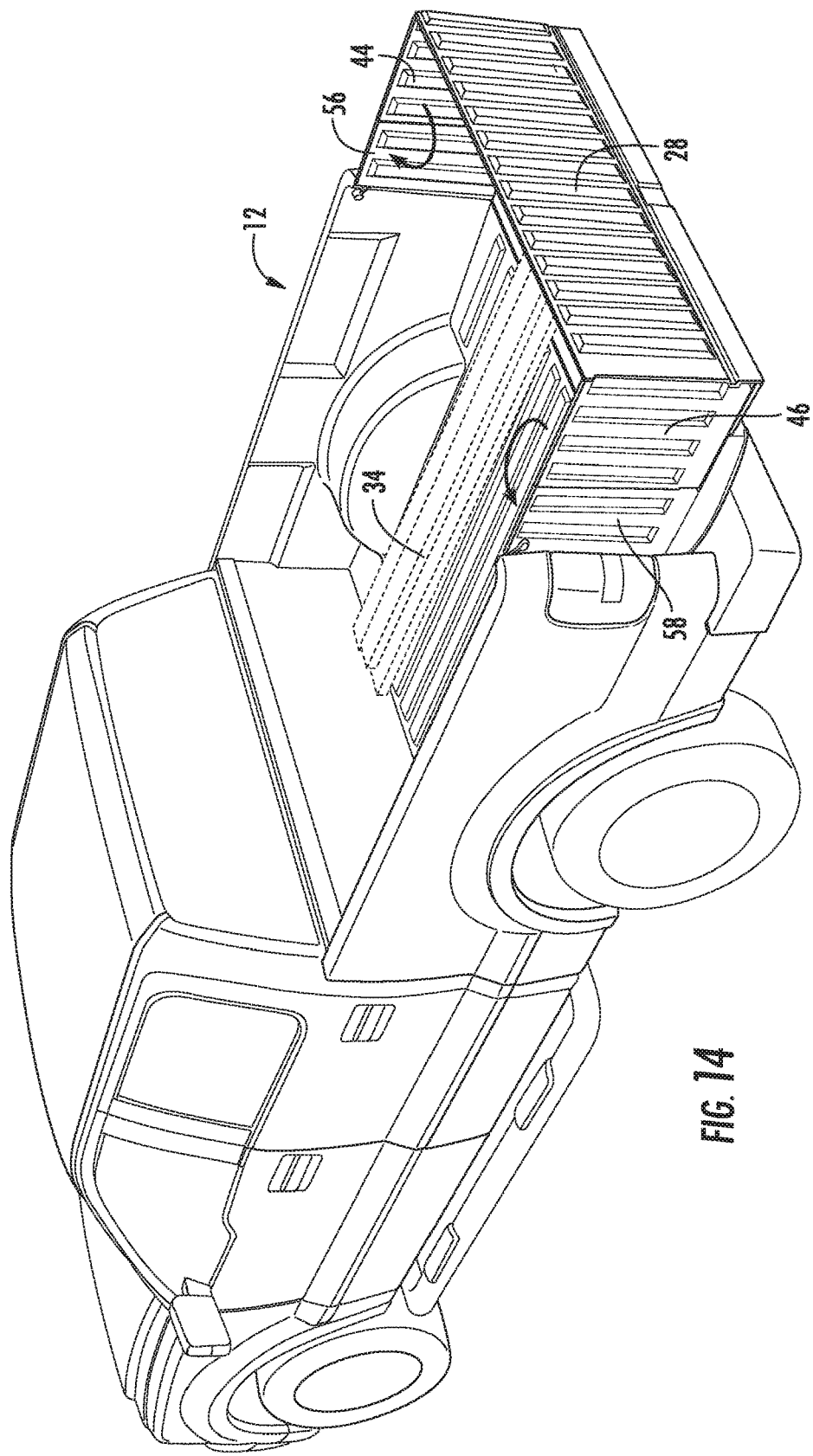
FIG. 14 illustrates left and right elongating side panels pivoted outward and secured to standard receivers of the truck bed with latches.

Once the second telescoping panel 52 is traversed to the expanded position as shown in FIG. 10, the front shell 28 may be pivoted downward so that the front shell 28 hangs downward as shown in FIG. 11. In this way, objects 34 can be slid onto or off of the truck bed 12. Once objects 34 are placed in the truck bed 12, the user can traverse the front shell 28 so that the front shell 28 is 90° with respect to the rear shell 30, shown in FIG. 12. The left and right side panels 44, 46 can be rotated outward as shown in FIG. 13. Moreover, left and right elongating panels 56, 58 can also be rotated to close the gap 60 between the left and right side panels 44, 46 and the left and right side walls 36, 38 of the truck bed 12. Once the latches 60, 62 are secured to the receivers, objects 34 placed on the truck bed cannot slip out of the truck bed 12 due to the front shell 28, left and right side panels 44, 46 and the left and right elongating panels 56, 58.

The front and rear shells 20, 30, left and right side panels 44, 46 and the left and right elongating panels 56, 58 may be fabricated from a variety of materials including but not limited to carbon fiber, steel, fiberglass, plastic, aluminum, and other materials known in the art or developed in the future.

The tailgate 10 described herein has been describe as a replacement to a factory tailgate. However, it is also contemplated that the tailgate may be offered as original equipment from the factory or manufacturer.

Figure 15:
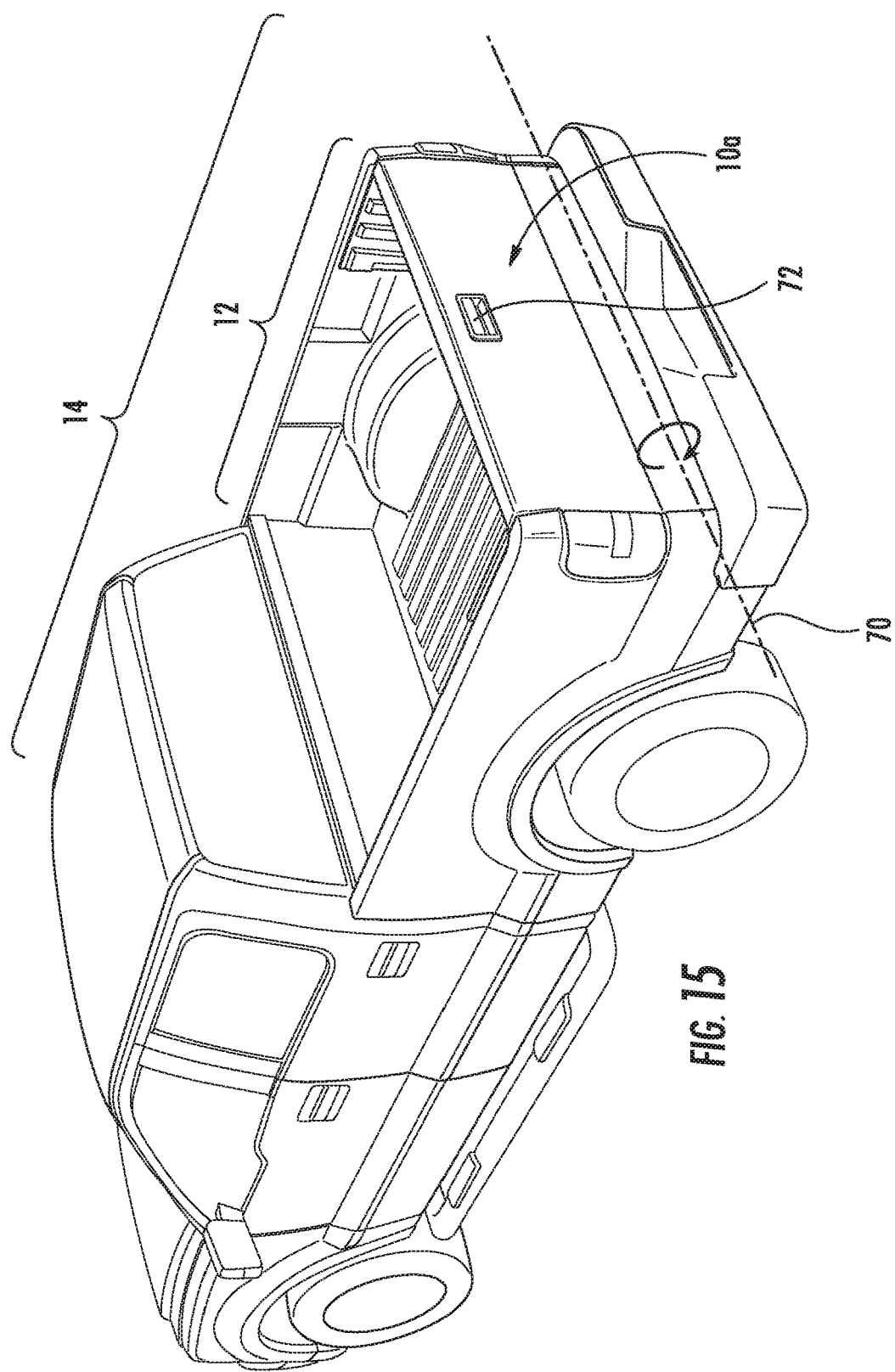
FIG. 15 illustrates a second embodiment of the pick up truck bed elongator.
Figure 16:
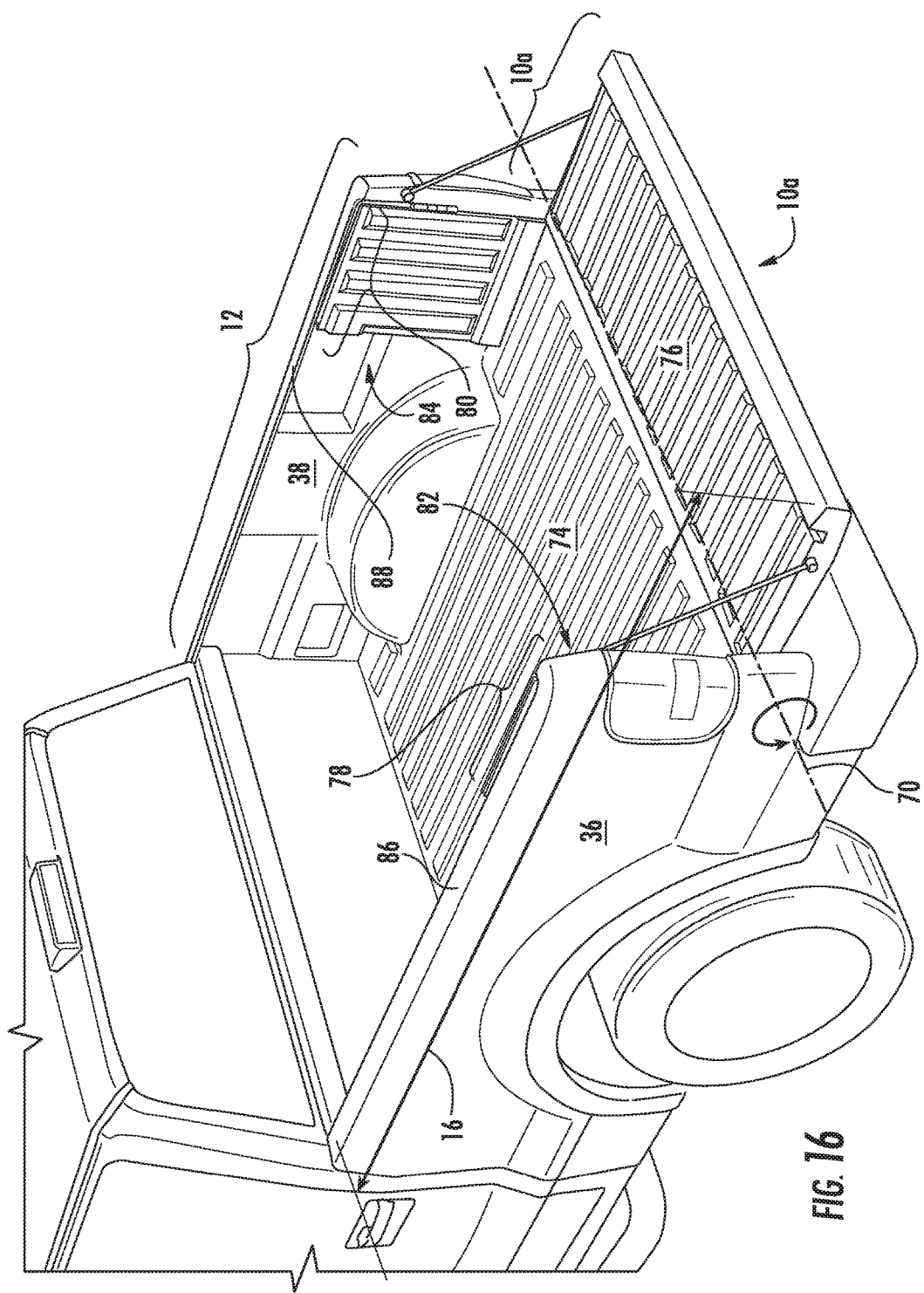
FIG. 16 illustrates the elongator of FIG. 15 with a tailgate in an opened position.
Figure 17:
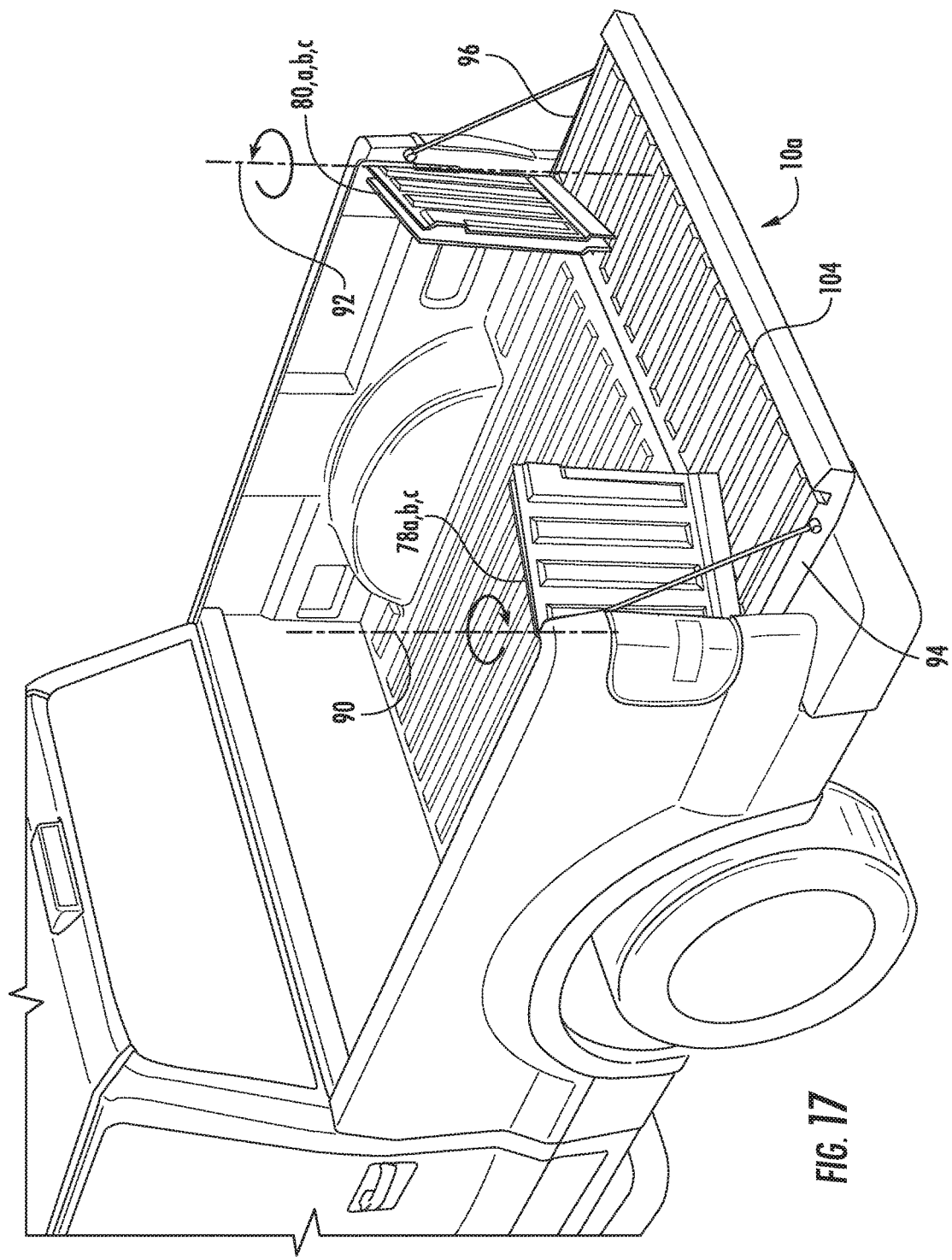
FIG. 17 illustrates the elongator of FIG. 15 with first, second and third vertical panels being traversed to an expanded position.

Referring now to FIGS. 15-20, a second embodiment of the apparatus and device for extending the factory length 16 (see FIG. 16) of the truck bed 12 of the truck 14 is shown. In particular, the replacement tailgate 10a may be attached to the truck bed 12 by attaching the tailgate 10a to the standard attachment mechanisms provided in the truck 14. By way of example and not limitation, the tailgate 10a may be pivotally attached to a rear portion of the truck bed 12. The tailgate 10a may pivot about pivot axis 70. Preferably, the pivot motion of the tailgate 10a may be limited to 90° as shown in FIGS. 15 and 16. The tailgate 10a when in the vertical orientation may be in the locked position and unlocked only when the user grips the handle 72 and releases the latching mechanism between the tailgate 10a and the factory latching mechanisms in the side walls of the truck bed 12 of the truck 14. When the tailgate 10a is pivoted downward as shown in FIG. 16, the tailgate 10a and more particularly an upper surface 76 of the tailgate 10a may be coplanar with an upper surface 74 of the truck bed 12 so that the tailgate 10a now extends the length 16 of the truck bed 12 plus the tailgate 10a. Objects 34 placed within the truck bed 12 may be retained therein with a plurality of driver-side vertical panels 78 and passenger-side vertical panels 80 which are stacked, folded, and stored into cavities 82, 84 formed by the side walls 36, 38 and the top ledge 86, 88 of the left and right side walls 36, 38. It is also contemplated that the plurality of driver-side vertical panels 78 and passenger-side vertical panels 80 may be stacked, folded and stored adjacent to but not within a cavity of the sidewalls 36, 38.

The passenger-side vertical panels 80a-c and the driver-side vertical panels 78a-c may be pivoted out as shown in FIGS. 17-20. In particular, panels 78a, 80a may pivot around 90° about vertical pivot axes 90, 92. The vertical panels 78a, 80a may extend out until the vertical panels 78a, 80a are parallel to left and right side edges 94, 96 of the tailgate 10a, shown in FIG. 18. The vertical panels 78a, 80a may be secured in this position by means known in the art or developed in the future. By way of example and not limitation, the vertical panels 78a, 80a may have detents or other latching mechanisms that may be used to attach the vertical panels 78a, 80a to the tailgate 10a.

Figure 20:
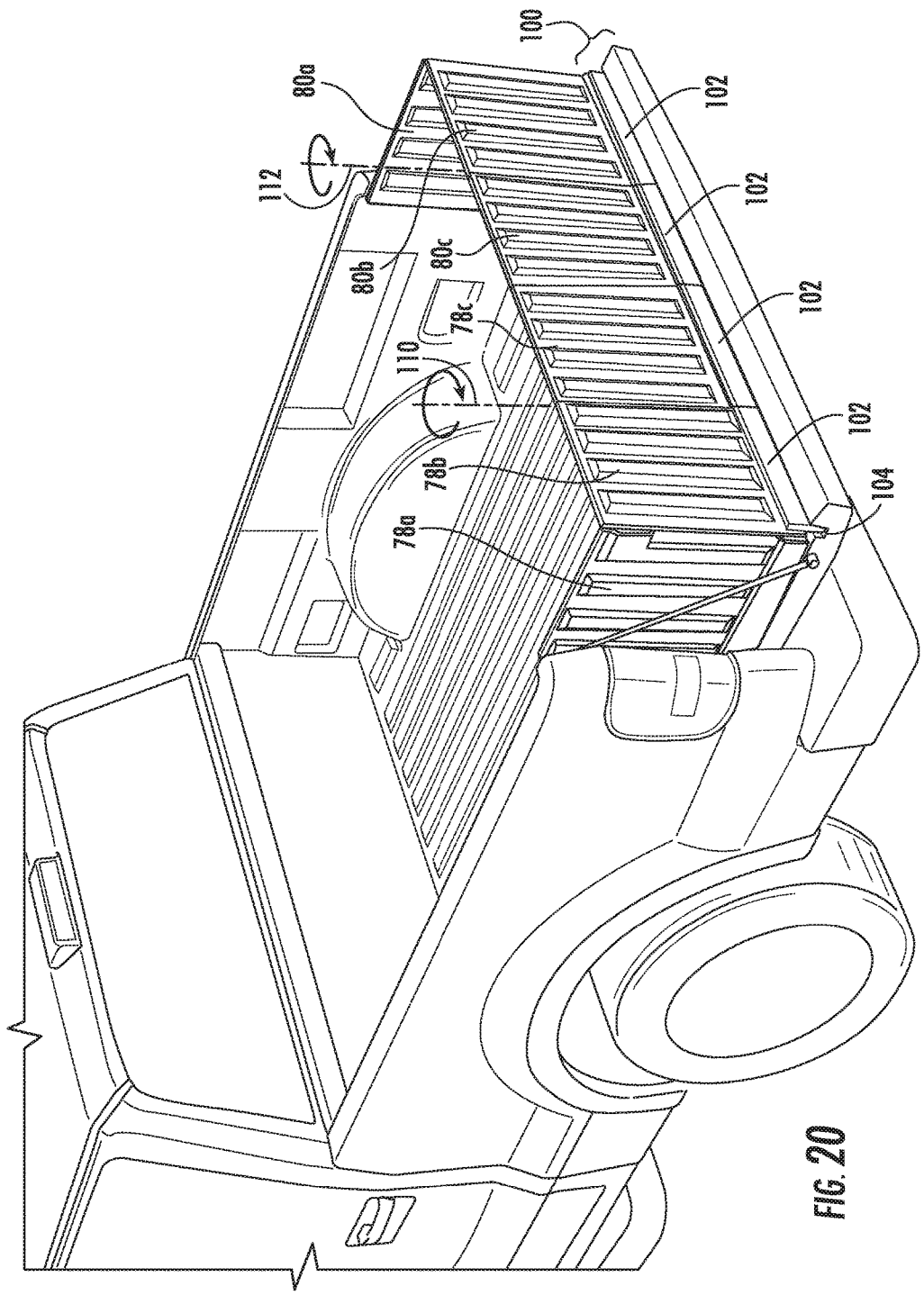
FIG. 20 illustrates the elongator of FIG. 15 with the first through third vertical panels traversed to the expanded position.

The panels 78b, 80b may be pivoted until the panels 78b, 80b are generally parallel with the back edge 98 of the tailgate 10a. The panels 78b and 80b may be pivoted about vertical pivot axes 104, 106. Likewise, the vertical panels 78c, 80c may be pivoted to close the opening 108 as shown in FIG. 20. The vertical panels 78c, a-c may be pivoted about vertical pivot axes 110, 112. The bottom edge portions 100 of the panels 78b, c and 80b, c may have a rubberized weather stripping 102. The weather stripping 102 may be received into a groove 104 formed in the upper surface 76 of the tailgate 10a. The panels 78b, c and panels 80b, c may be held in position by way of latching mechanisms known in the art or developed in the future. By way of example and not limitation, these latching mechanisms include but are not limited to detents, over center latches, etc. Moreover, the disposition of the weather strip 102 of the panels 78b, c and 80b, c also help to retain the panels 78b, c, 80b, c parallel to the back edge 98 of the tailgate 10a. The two vertical panels 78c, 80c may also be latched together with the latching mechanism known in the art or developed in the future. In this manner, objects 34 placed in the truck bed may roll around in the truck bed 12 but will not roll out of the truck bed 12 because the objects 34 are blocked by the vertical panels 78a, b, c and panels 80a, b, c.

The tailgate has been described as having third vertical panels 78c and 80c in order to close the back edge of the tailgate. However, it is also contemplated that the second vertical panels 78b and 80b which are rotatably attached to the first vertical panels 78a and 80a may be sufficiently long so that distal ends of the second vertical panels 78b and 80b can be latched to each other with the latching mechanism that latches the third vertical panels 78c and 80c together, as discussed above.

Figure 18:
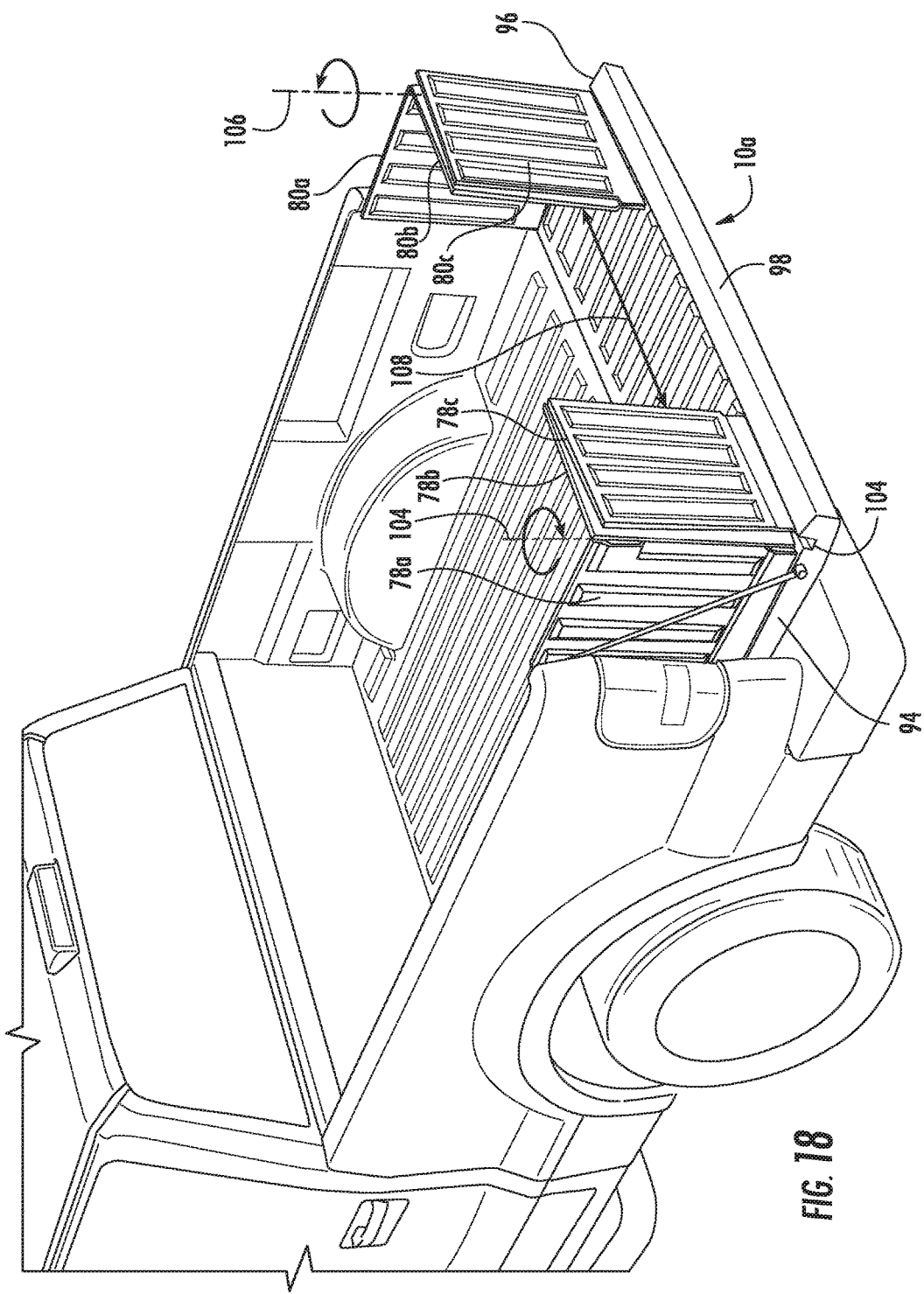
FIG. 18 illustrates the elongator of FIG. 15 with the first and second vertical panels traversed to the expanded position.
Figure 19:
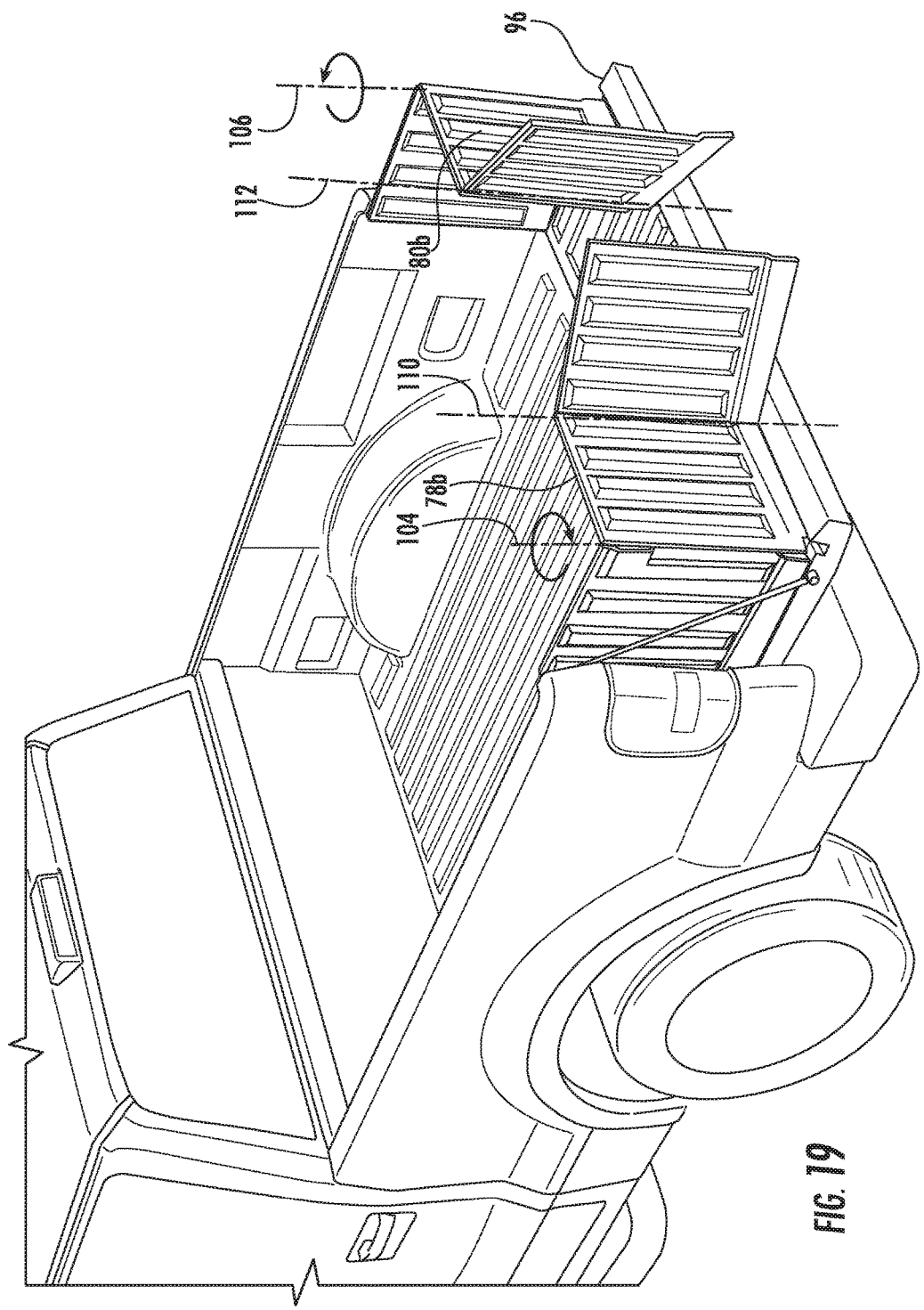
FIG. 19 illustrates the elongator of FIG. 15 with the third vertical panel being traversed to the expanded position.

In a variant of the second embodiment of the tailgate 10a, the original factory tailgate may be utilized in conjunction with the left and right vertical panels 70a, b, c and vertical panels 80a, b, c. To this end, the hinge that allows the panels 78a, 80a to be pivoted about vertical pivot axes 90, 92 may be locked in the deployed state as shown in FIG. 18. Likewise, the hinge that enables the panels 78b, 80b to pivot about vertical pivot axes 104, 106 may be locked in the deployed state as shown in FIG. 19. Optionally, the hinge that enables the panels 78c, 80c to pivot about vertical axes 110, 112 may be locked in the deployed state as shown in FIG. 20 or alternatively the panels 78c and 80c may freely rotate out the vertical pivot axes 110, 112 and be locked in the deployed state as shown in FIG. 20 by way of the latching mechanism that secures the panels 78c to 80c and vice versa.

In the second embodiment, the passenger-side vertical panels are made up of three panels 80a-c. The driver-side vertical panels 78 are also made up of three vertical panels 78a-c. It is also contemplated that the panel 78a and 80a which are parallel to the left and right edges 94, 96 of the tailgate 10a may be made up of one or more panels that are rotatably attached to each other. The panels 78*b-c* and 80*b-c* may also be each made up of one or more panels that are rotatably attached to each other.

Figure 21:
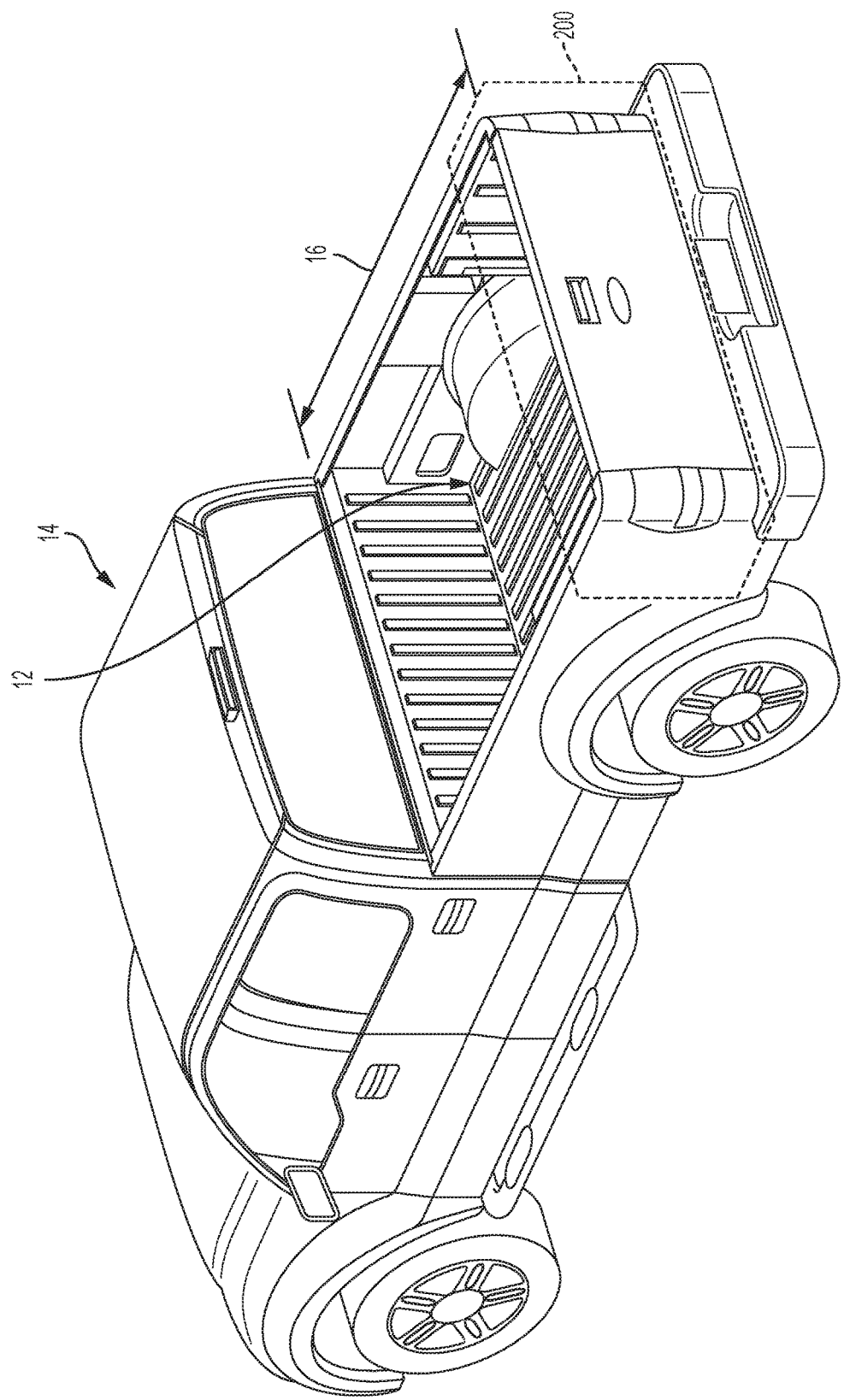
FIG. 21 illustrates a third embodiment of the pick up truck elongator.
Figure 22:
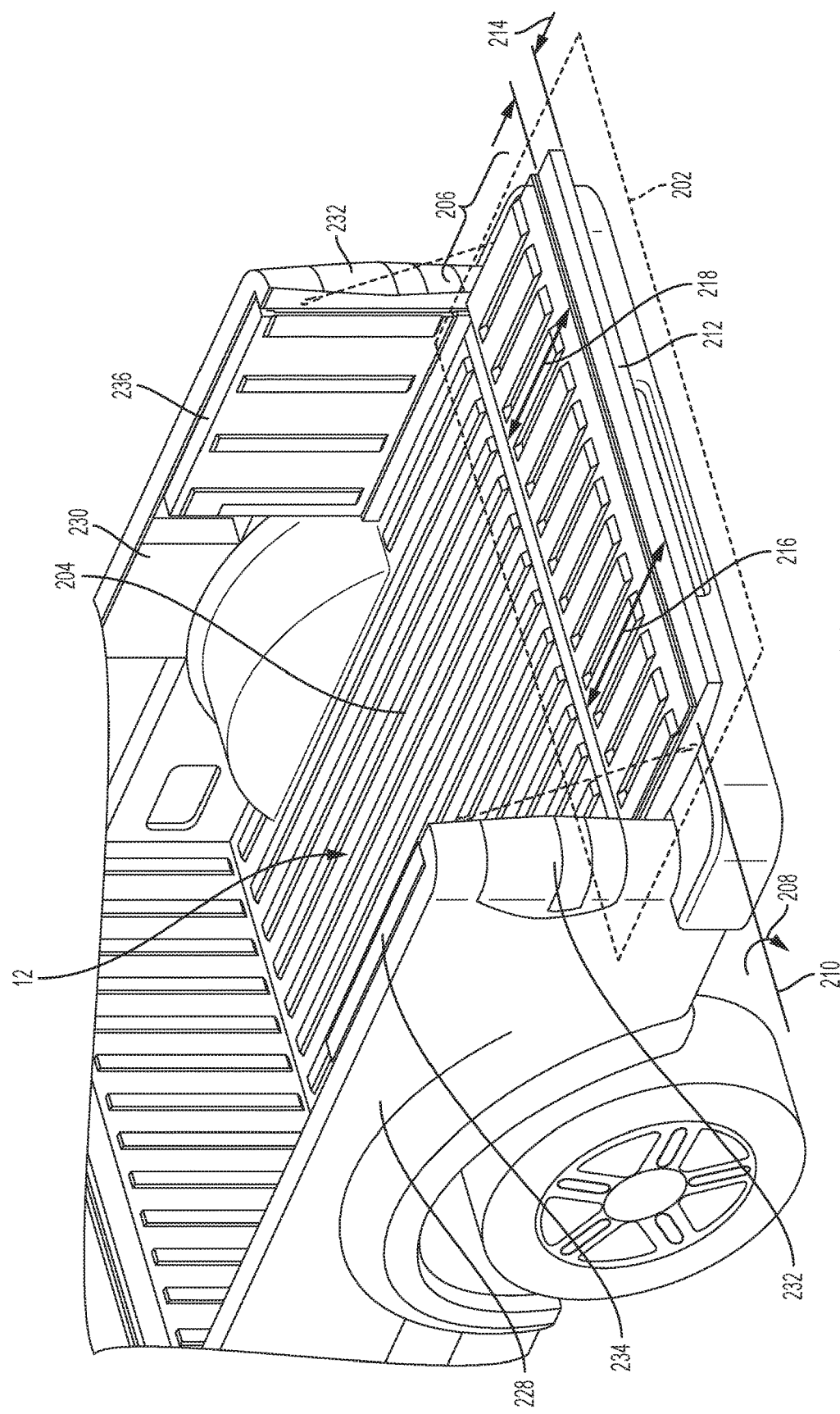
FIG. 22 illustrates the pick up truck elongator shown in FIG. 21 with a tailgate in a down position.
Figure 23:
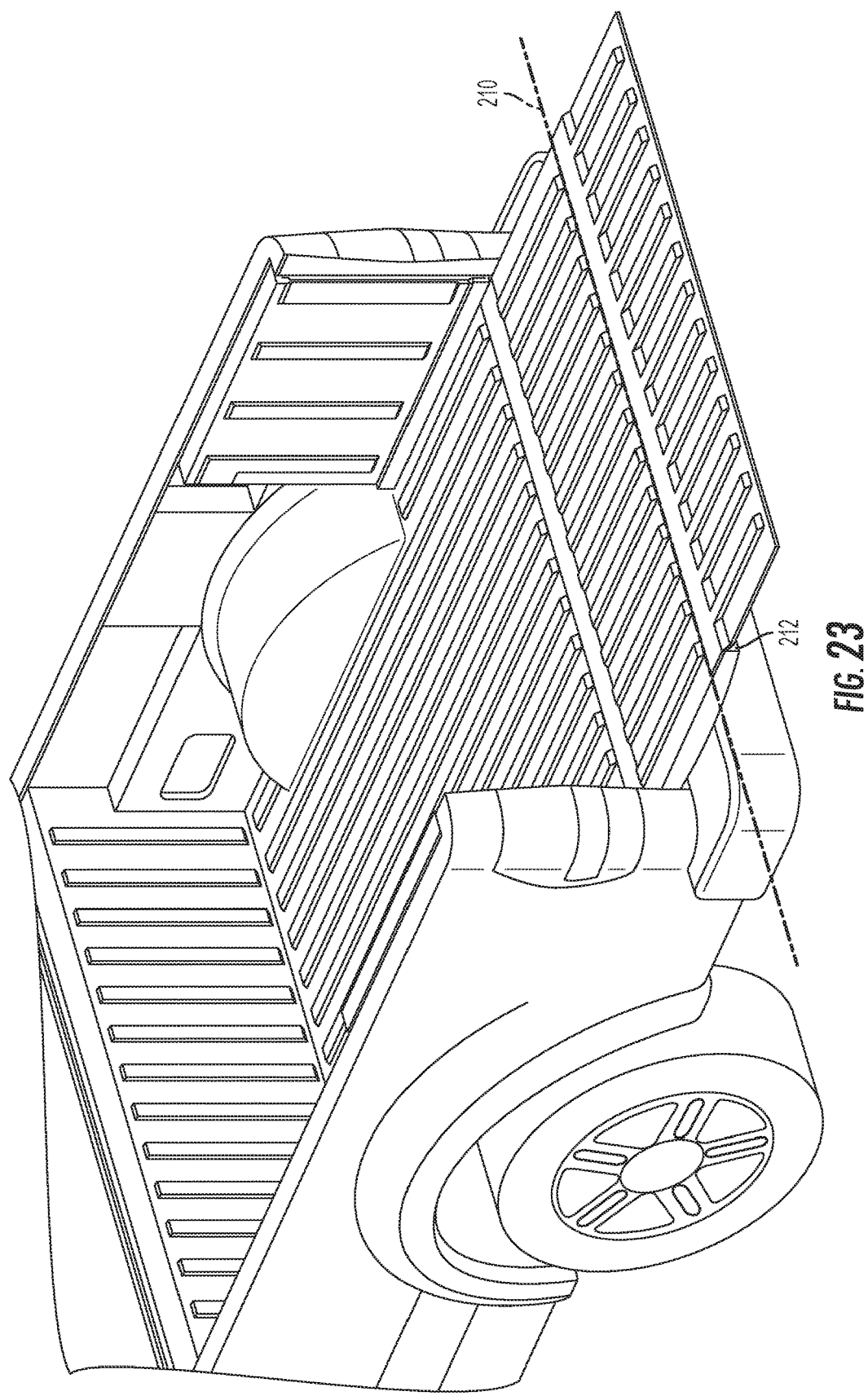
FIG. 23 illustrates the pick up truck elongator shown in FIG. 21 with an extension pivoted out from the tailgate.

Referring now to FIGS. 21-27, a third embodiment of the pick up truck elongator 200 for extending a factory length 16 of a truck bed 12 of the truck 14 is shown. The pick up truck elongator 200 may be factory installed or installed by a retail owner of the truck 14. The elongator 200 may have a replacement tailgate 202 that replaces the factory tailgate if the pick up truck elongator 200 is installed by the retail owner of the truck 14. The replacement tailgate 202 may be mounted to the truck bed in the same manner that the original factory tailgate is mounted to the truck bed. Although shown only in phantom, the replacement tailgate 202 may have cables that hold the tailgate 202 in a horizontal position or coplanar with a floor 204 of the truck bed 12 when the replacement tailgate 202 is in the down position as shown in FIG. 22.

To deploy the pick up truck elongator 200 to extend the factory length 16 of the truck bed 12, the tailgate 202 may be traversed from the up position as shown in FIG. 21 to the down position, shown in FIG. 22. In the down position, an extension panel 206 of the tailgate may be pivoted up and out as shown by rotational arrow 208 about pivot axis 210. The pivot axis 210 is offset inward from an upper edge 212 of the tailgate 202. The offset distance 214 may be about 2 inches to about a full height 216 of the replacement tailgate 202. Preferably, the offset distance 214 is about 6 inches inward from the upper edge 212. A height 218 of the extension panel 206 may be equal to or less than a difference between the height 216 of the replacement tailgate 202 and the offset distance 214. In the figures, the extension panel 206 is shown as being pivotally attached to the replacement tailgate 202. However, it is also contemplated that the extension panel may be pivotally attached to the floor 204 of the truck bed 12. In this regard, the pivot axis 210 will be moved over the truck bed 12 and a height 218 of the extension panel 206 may be sufficiently long to extend beyond the upper edge 212 of the replacement tailgate 202 when the replacement tailgate 202 is in the down position and the extension panel 206 is pivoted out. As a further alternative, it is contemplated that the extension panel 206 may simply be an add-on that is mounted to the tailgate 202 and/or the floor 204. As a further alternative, it is contemplated that the extension panel 206 may slide out from the tailgate 202 beyond the upper edge 212 of the tailgate 202. The sliding out of the extension panel 206 may be accomplished by embedding the extension panel 206 within the tailgate 202 or placing the extension panel 206 on top of the tailgate 202 so that the extension panel 206 is parallel with the upper surface of the tailgate 202 when the tailgate 202 is in the down position as shown in FIG. 22.

The replacement tailgate 202 may also come with two sets 220, 222 of the plurality of panels 224, 226. The first set 220 of the plurality of panels 224 may be mounted to the driver side wall 228 of the truck bed 12. The second set 222 of the plurality of panels 226 may be mounted to the passenger side wall 230. The driver side wall and passenger side wall 228, 230 of the truck bed 12 may have interior side hollow cavities in which the first and second sets 220, 222 of the plurality of panels 224, 226 may be stored. The hollow cavities in the sidewalls 228, 230 may be formed by the taillight and may be disposed directly behind the taillight 232. When the first and second sets 220, 222 are in the stored position, the first and second sets 220, 222 are disposed within the cavities in the sidewalls 228, 230 behind the taillights 232. To deploy the plurality of panels 224, 226 of the of the first and second sets 220, 222, the housings 234, 236 may be traversed medially so that the plurality of panels 224, 226 can be slid out and disposed vertically above the tailgate 202 and the extension panel 206, as shown in FIG. 25. Although the figures and description explain that the housings 234, 236 are stored in the cavities then traversed medially in order to deploy the elongator 200, it is also contemplated that the housings 234, 236 may be fixedly attached to the sidewalls 228, 230 in the position shown in FIG. 24. In that fixed position, the plurality of panels 224, 226 can be slid out over the tailgate 202 and the extension panel 206.

In the figures and description, it is explained that the elongator 200 elongates the truck bed 12 to a distal edge 238 of the extension panel 206. However, it is also contemplated that the extension panel 206 may be an optional component of the elongator 200. In this regard, the plurality of panels 224, 226 would slide out over the tailgate 202 then be pivoted inward to close off the back end of the extended truck bed portion of the elongator 200. The panels would be aligned to the edge 212 of the tailgate.

Figure 24:
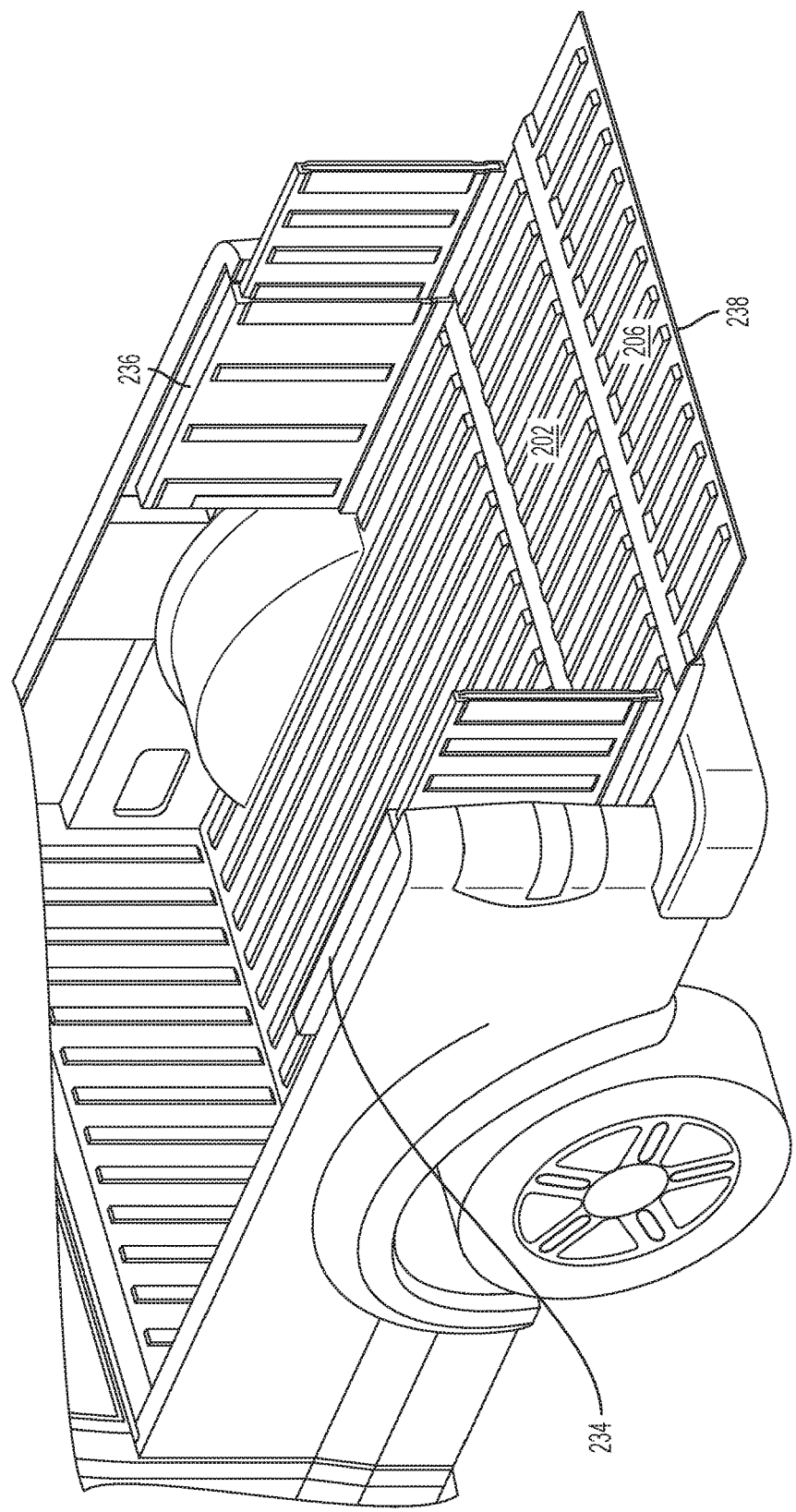
FIG. 24 illustrates housings for a plurality of panels being traversed out of the cavities defined by sidewalls of the truck bed and the plurality of panels telescoping outward.
Figure 25:
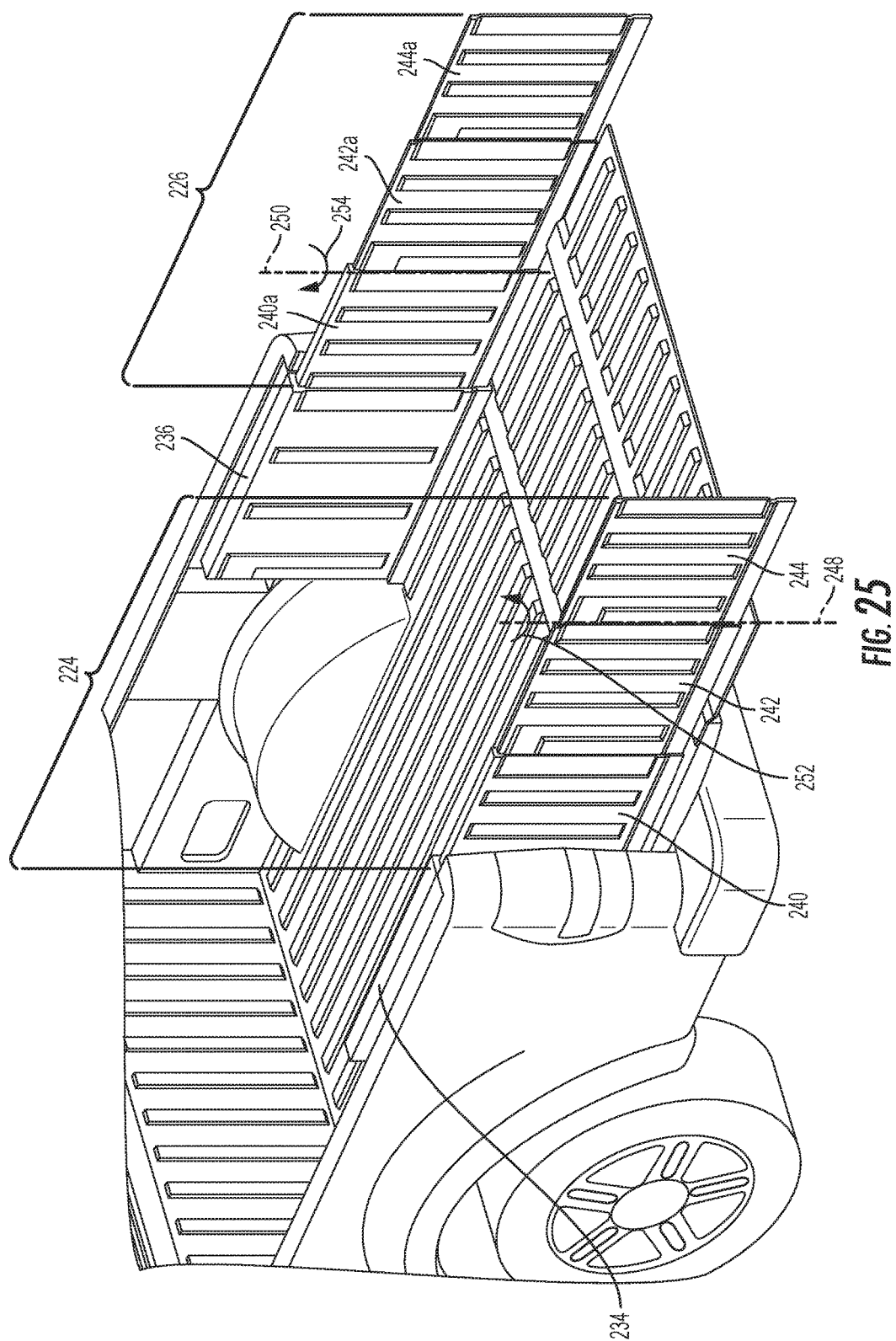
FIG. 25 illustrates the plurality of panels continuing to telescope outward.
Figure 26:
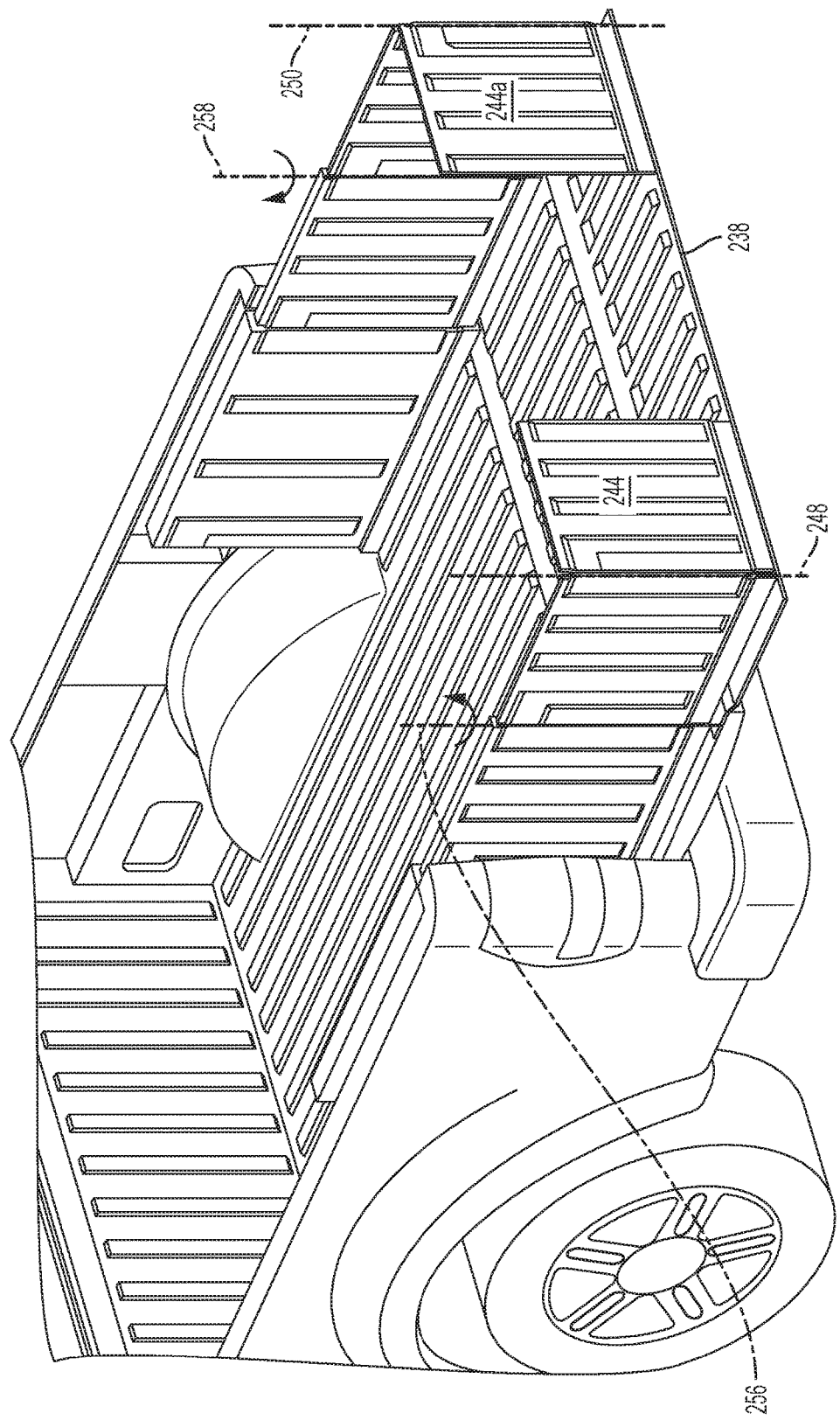
FIG. 26 illustrates the plurality of panels being pivoted so to be disposed at an edge of the tailgate.

With the first and second sets 220, 222 and more particularly the housings 234, 236 traversed medially inward as shown in FIG. 24, the plurality of panels 224, 226 may be telescoped outward, as shown in FIG. 25. In this exemplary embodiment, the plurality of panels 224, 226 may each have four panels each 240, 242, 244 and 246 and 240*a*, 242*a*, 244*a*, and 246*a*. Panels 240, 242 and 240*a*, 242*a* are slid out of the housings 234, 236. The panels 244, 246 and 244*a*, 246*a* are slid out of the panel 242, 242*a*. Also, these panels 244, 246 and 244*a*, 246*a* may be pivoted about panels 242, 242*a* about vertical pivot axis 248, 250 and pivoted in the direction of rotational arrows 252, 254. Preferably, the panel 246, 246*a* are disposed in panel 244, 244*a* when the panels 244, 244*a* are being rotated. After the panels 242, 242*a* are rotated about pivot axis 248, 250, the panels 244, 244*a* are parallel to the distal edge 238 of the extension panel 206. If the extension panel 206 was not utilized, then the panel's lengths could have been adjusted so that panel 242, 242*a* would have been pivoted about pivot axis 256, 258 so that the panels 242, 244 and panels 242*a*, 244*a* would have been parallel and aligned to the upper edge 212 of the tailgate 202.

Figure 27:
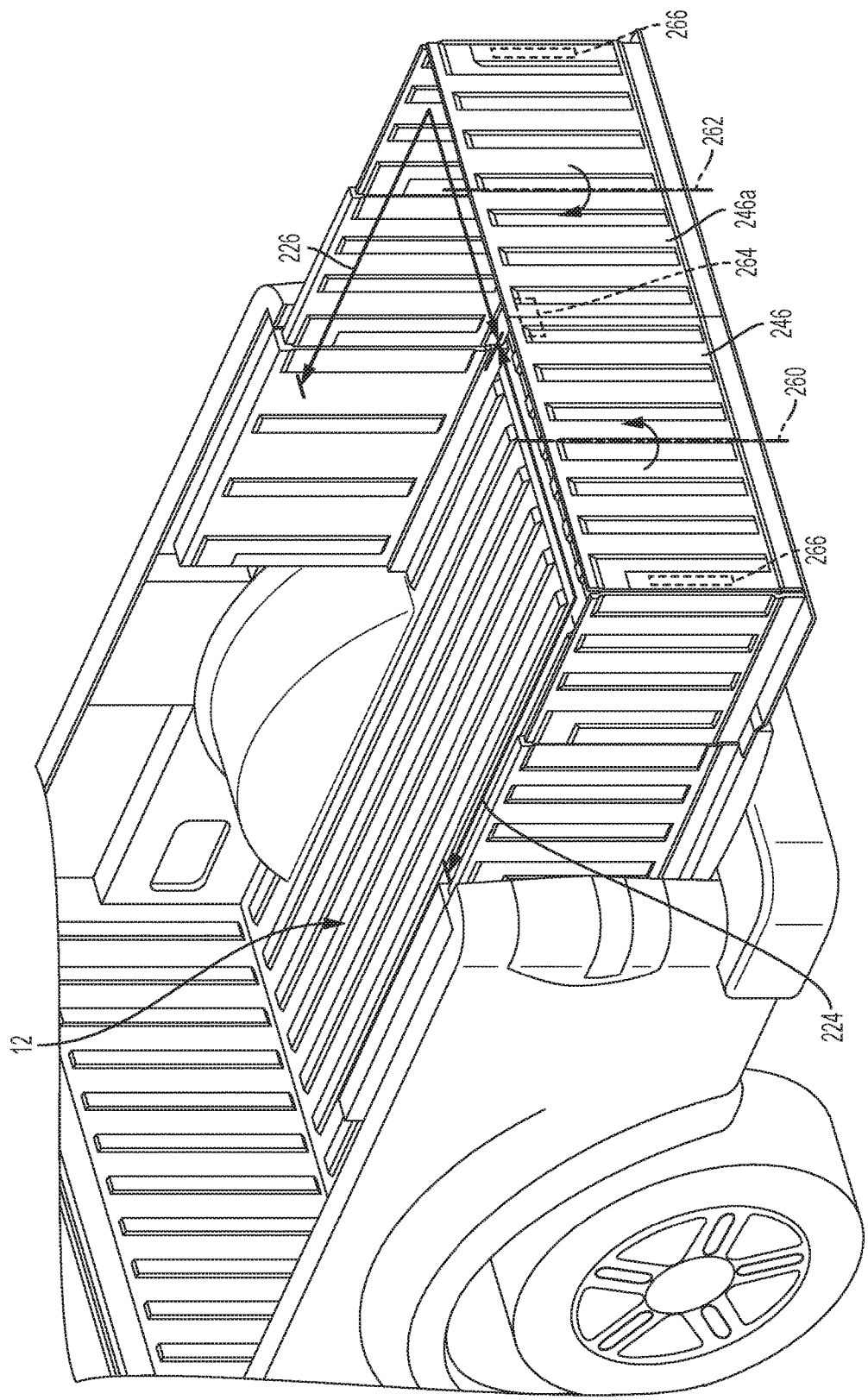
FIG. 27 illustrates the plurality of panels being traversed to form an enclosure of the truck bed.

With the panels 244, 244*a* parallel to the distal edge 238 of the extension panel 206, the panels 246, 246*a* may be slid out from the panels 244, 244*a* and lock to each other in order to form the enclosure of the truck bed 12, as shown in FIG. 27. The panels 246, 246*a* are shown as being slid out from the panels 244, 244*a*, however, it is also contemplated that the panels 246, 246*a* may be pivoted out from a side of the panels 244, 244*a* about pivot axes 260, 262.

When the elongator 200 is deployed, as shown in FIG. 27, brake and taillights 264, 266 may be mounted to the panels 244, 244*a*, 246, 246*a* as a separate add-on or may be embedded therein and wired to the automobile's electrical system so that the brake and taillights 264, 266 work when the blinkers and brakes are being actuated by the driver.

Referring now to FIGS. 28-31, a fourth embodiment of the elongator 300 is shown. The elongator 300 has housings 334, 336 that house a plurality of panels 324, 326. The plurality of panels 324, 326 include panels 340, 340*a*, 342 and 342*a* which telescope outward in unison with the extension panel 306 as the elongator 300 is being deployed.

The extension panel 306 is stored on the floor 304 of the truck bed 12 when the elongator 300 is not deployed or in the stored position. The extension panel 306 may be disposed on top of the floor 304 or below the floor. The extension panel 306 may be secured to the panel 342, 342*a* so that the plurality of panels 324, 326 telescope outward in unison with the extension panel 306.

Figure 28:
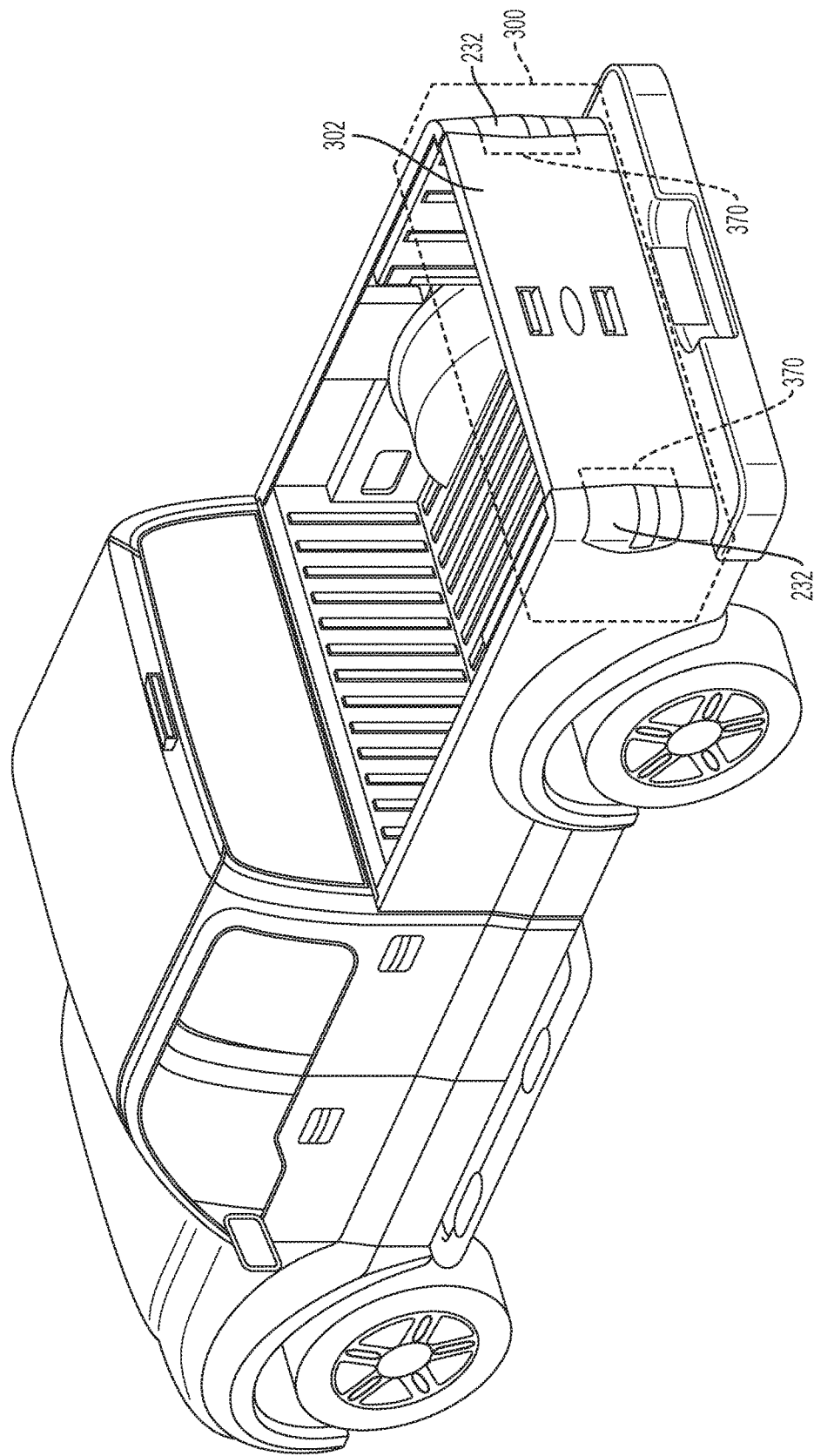
FIG. 28 illustrates a fourth embodiment of the pick up truck elongator.
Figure 29:
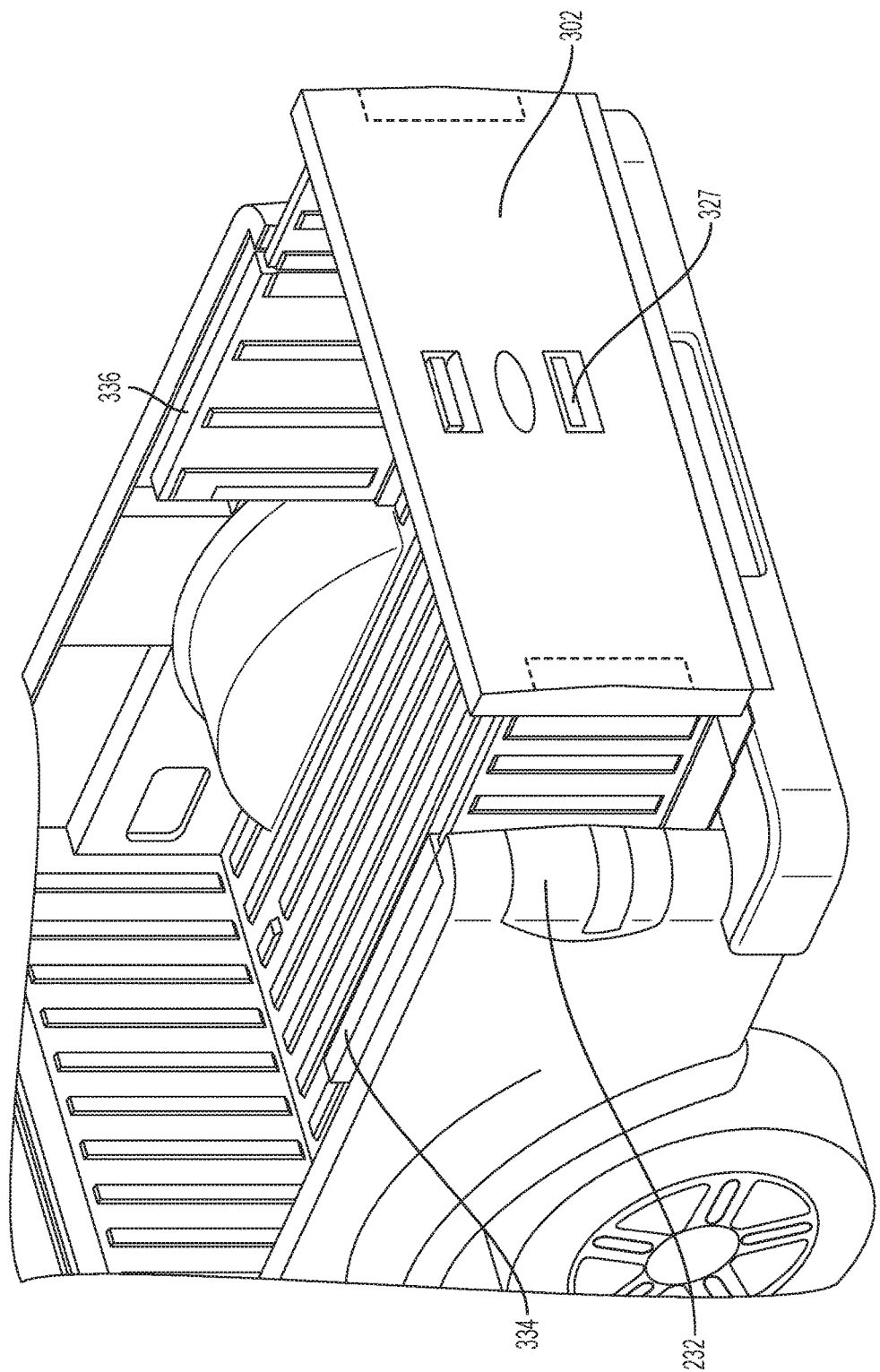
FIG. 29 illustrates a plurality of panels which form sidewalls and a floor of an extended portion of the truck bed being telescoped outward with a tailgate.
Figure 30:
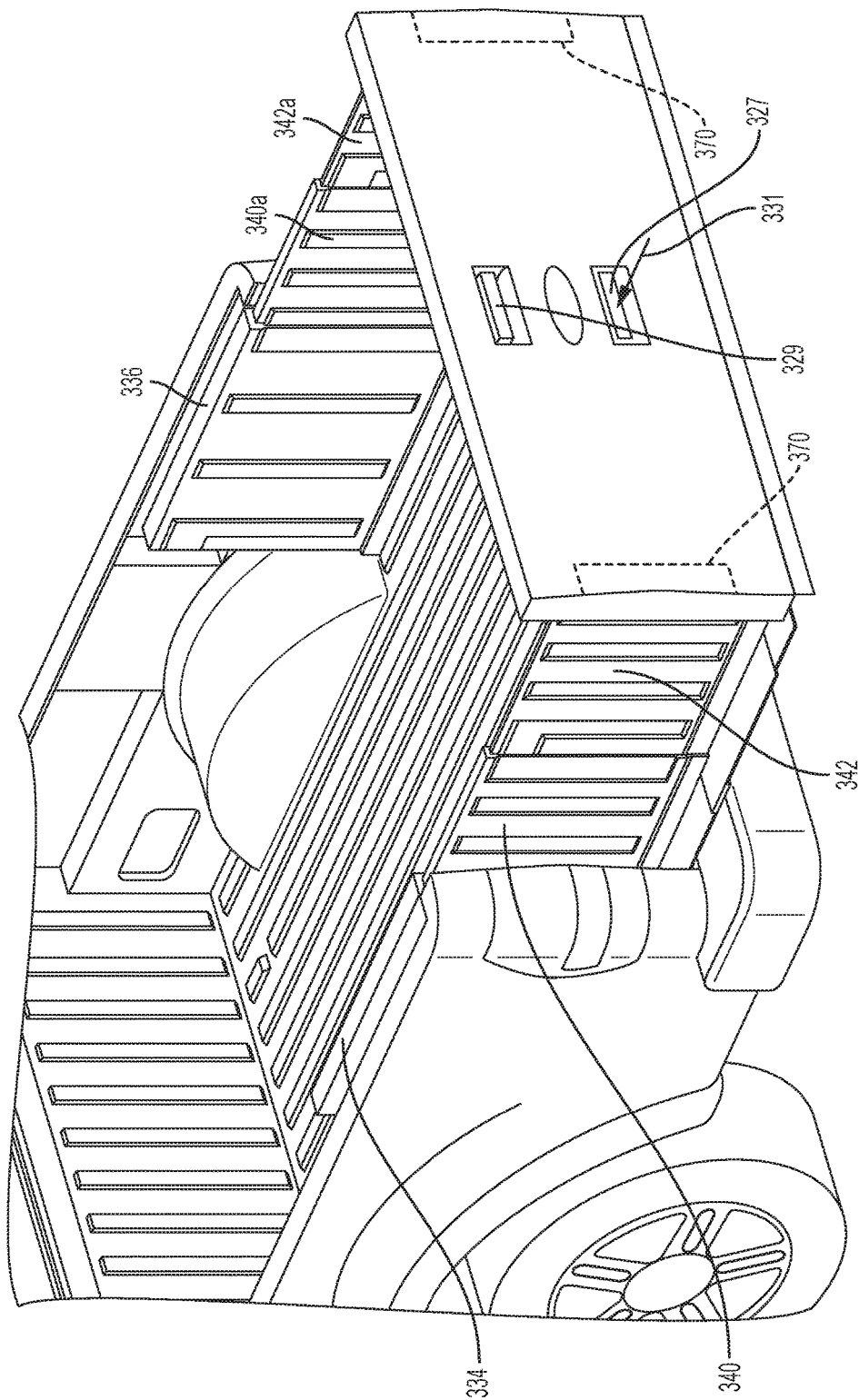
FIG. 30 illustrates the plurality of panels continuing to be telescoped outward.
Figure 31:
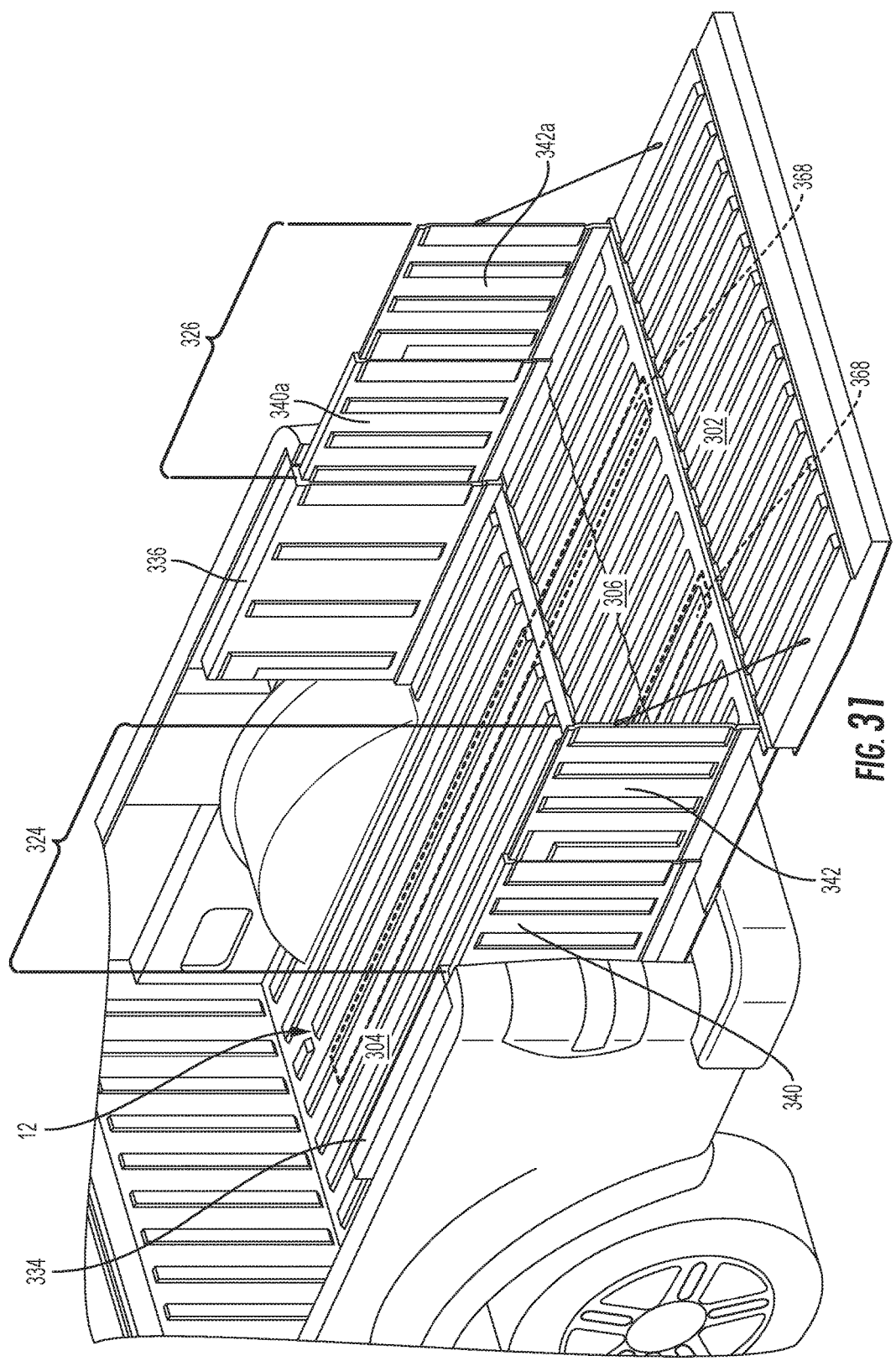
FIG. 31 illustrates the tailgate being traversed to the down position.
Figure 32:
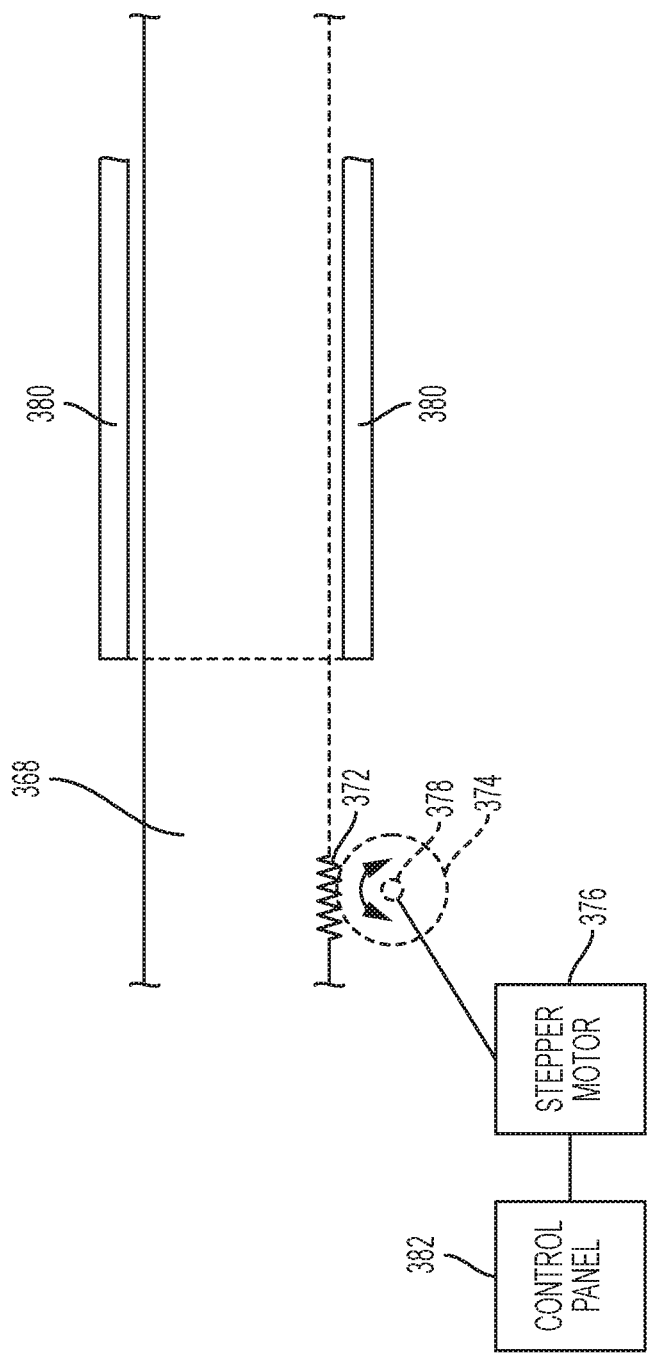
FIG. 32 illustrates a mechanism for retracting and deploying the elongator under a power of a motor controlled with a control panel.

More particularly, the elongator may be similar to a drawer of a cabinet which may be pulled out in order to extend the length of the truck bed. The elongator 300 may be locked into the closed position as shown in FIG. 28. However, when it is desired to lengthen the length of the truck bed, the user may unlock a lock of the elongator so that the elongator may be deployed as shown in FIGS. 29-31. The lock may be unlocked with a handle 327. When the handle is lifted up, then the lock is unlocked and when the handle which is spring biased down is released so as to return to the down position, the lock may be locked again so that the elongator 300 does not extend or retract back in. When fully deployed, the elongator 300 may provide an additional 1 to 6 feet (preferably an additional 2-4 feet) of additional length to the truck bed 12. FIG. 30 illustrates the elongator 300 in the fully deployed position. However, it is also contemplated that the elongator 300 may have a plurality of intermediate positions between the closed and fully deployed positions as well. The elongator may be pulled backward and locked with a locking mechanism into positions by increments of 6 inches or other factor (e.g., 2, 4, 8, 10 inches) until the elongator 300 is fully deployed.

The housings 334, 336 of the elongator 300 may be fixed in position as shown in FIG. 29. The housings 334, 336 are positioned medially from the taillights 232 so that the plurality of panels 324, 326 may be telescoped outward or backward as the elongator 300 is being deployed without having to reposition the housings 334, 336 medially (as discussed in relation to FIGS. 23 and 24 above). The housings 334, 336 may house the panels 340, 342, 340a, 342a. As the tailgate 302 is being moved backward, the panels 340, 340a, 342, 342a may be telescoped out. Moreover, the extension panel 306 may also be retracted outward. The extension panel 306 may be one piece or a plurality of panels that telescope outward. For example, the extension panel 306 may have two panels that telescope outward as the tailgate 302 is being moved backwards to deploy or lengthen the truck bed. When the elongator is fully deployed as shown in FIG. 31, the elongator 300 may be locked in position by way of a plurality of detents or other mechanism. The tailgate 302 may be disposed in the down position, as shown in FIG. 31 in order to access the truck bed 12. Additionally, the extension panel 306 may be supported by a support structure 368 (e.g., telescoping I beam) attached to the truck bed (e.g., underside thereof) and extendable out from the truck bed as the extension panel 306 is being deployed. The support structure 368 may be telescoping and provide the necessary support to hold weight placed on the extension panel 306 when in the deployed position. The support structure may be located below the floor of the truck bed and under the extension panel 306 so that the truck bed remains generally flat and does not interfere with loading a flat plywood, lumber, furniture, or other objects into the truck bed.

The tailgate 302 may also have taillights 370 which are the primary taillights 370 which will be seen when the elongator 300 is extended into the deployed position as shown in FIG. 30. When the elongator 300 is deployed, the taillights 232 on the sidewalls 228, 230 are not fully visible or are blocked by the elongator 300 and itself. Taillights 370 may be electrically connected to the electrical system of the truck so that the taillights 370 operate in the same fashion and time as taillights 232. The electrical wires may be routed through the panels 340, 342, 340a, 342a. The taillights 370 may be aesthetically blended in with the taillights 232 so that the taillights 370 appear to be one with the taillight 232 when the elongator 300 is in the undeployed position (see FIG. 28). By way of example and not limitation, a height and position of the taillights 370 may be aligned to the height and position of the taillight 232, as shown in FIG. 28.

The support structures 368 may be secured to the truck bed 12, and more particularly to the floor 304 of the truck bed 12. The support structures 368 may be disposed under the floor 304 and slide out from under the floor 304 of the truck bed 12 when the elongator 300 is deployed. When the elongator 300 is traversed to the deployed position, the support structures 368 may still be firmly secured to the floor 304 of the truck bed 12. The support structures 368 are described as being attached to the floor 304 but also it is contemplated that the support structures 368 may be attached to the frame or other structural components of the truck 14. The support structures 368 may each be a single elongate piece that slides in and out of the sleeve 380 attached to the frame, or floor or a structural component of the truck. The single elongate piece extends out with the extension panel 306 of the elongator 300. The support structures 308 may also be telescoping.

The single elongate pieces of the support structures 368 may have a rack 372 that is paired to a pinion 374. The pinion 374 may be rotatable clockwise and counterclockwise directions with a motor 376 (e.g., stepper motor) attached to a shaft 378 which is also attached to the pinion 374. The stepper motor 376 moves the support structure 368 within the sleeve 380. The support structure 368 is slidable within the sleeve 380 and the sleeve 380 is fixedly secured to the truck 14, floor 304 or the frame of the truck 14. The sleeves 380 provide the support so that when a heavy object is loaded on the deployed elongator 300, the extension panel 306 and the panels 324, 326 do not sag downward. The support structures 368 are also fixable or movable or associated with extension panel 306. In other words, when the extension panel 306 moves out, the support structures 368 may be extended. The support structures 368 may extend the full length of the extension panel 306 as shown in FIG. 31 or may be only partially under the extension panel 306 as needed. The stepper motor 378 may be operable by way of a control panel 382 located on or adjacent to the truck bed 12. The control panel 382 is operative to control the clockwise or counterclockwise rotational movement of the stepper motor 378 in order to deploy or retract the support structures 368 and also the elongator 300. The control panel 382 may traverse the elongator 300 to the deployed position by turning the pinion 374 which traverses the support structures 368 to the extended position. When the support structure 368 is attached or connected to the extension panel 306 and extension panel 306 is connected to the plurality of panels 324, 326, extension of the support structures 368 also traverses the elongator 300 into the deployed position. The stepper motor 378 provides an incremental adjustment and lock to the amount of extension provided by the elongator 300. In this regard, the stepper motor 378 may provide for incremental adjustments to the extension of the elongator less than 6 inches per increment.

The stepper motors 378 may be used to hold the position of the elongator 300 in its deployed state. However, additional or alternative locking mechanisms (e.g. detents and clamps) may be utilized in order to further secure the position of the elongator 300 in the deployed state. The deployed state may be when the elongator 300 is partially (see FIG. 28) or fully extended out. The support structures 368 may each have the rack and pinion configuration along with the stepper motor 378, 380 discussed above in order to provide an even traversal of the elongator from the retracted position to the deployed position. One control panel 382 may control the operation of both stepper motors 378 each of the support structures. Additionally, the stepper motors 378 may be controlled with controls (e.g. button, switch or electronic panel) located in the cabin of truck 14.

Referring back to FIG. 30, the tailgate may have two different handles 327 and 329. Handle 327, as discussed above, may be operative to lock and unlock the lock that fixes the position of the elongator 300. Additionally, the handle 327 may also be operative to rotate the stepper motors 378 in either the clockwise or counterclockwise direction in order to extend the elongator 300 when the handle 327 is lifted up or to retract the elongator 300 when the handle 327 is traversed downward and pushed inward as shown by directional arrow 331. When the inward force is removed, the handle 327 may return to its normal position and stop rotation of the stepper motors 378. The handle 327 may essentially be a switch that operates one or both of the stepper motors 378 and the lock. Handle 329 is operative to let the tailgate down as shown in FIG. 31.

Figure 33:
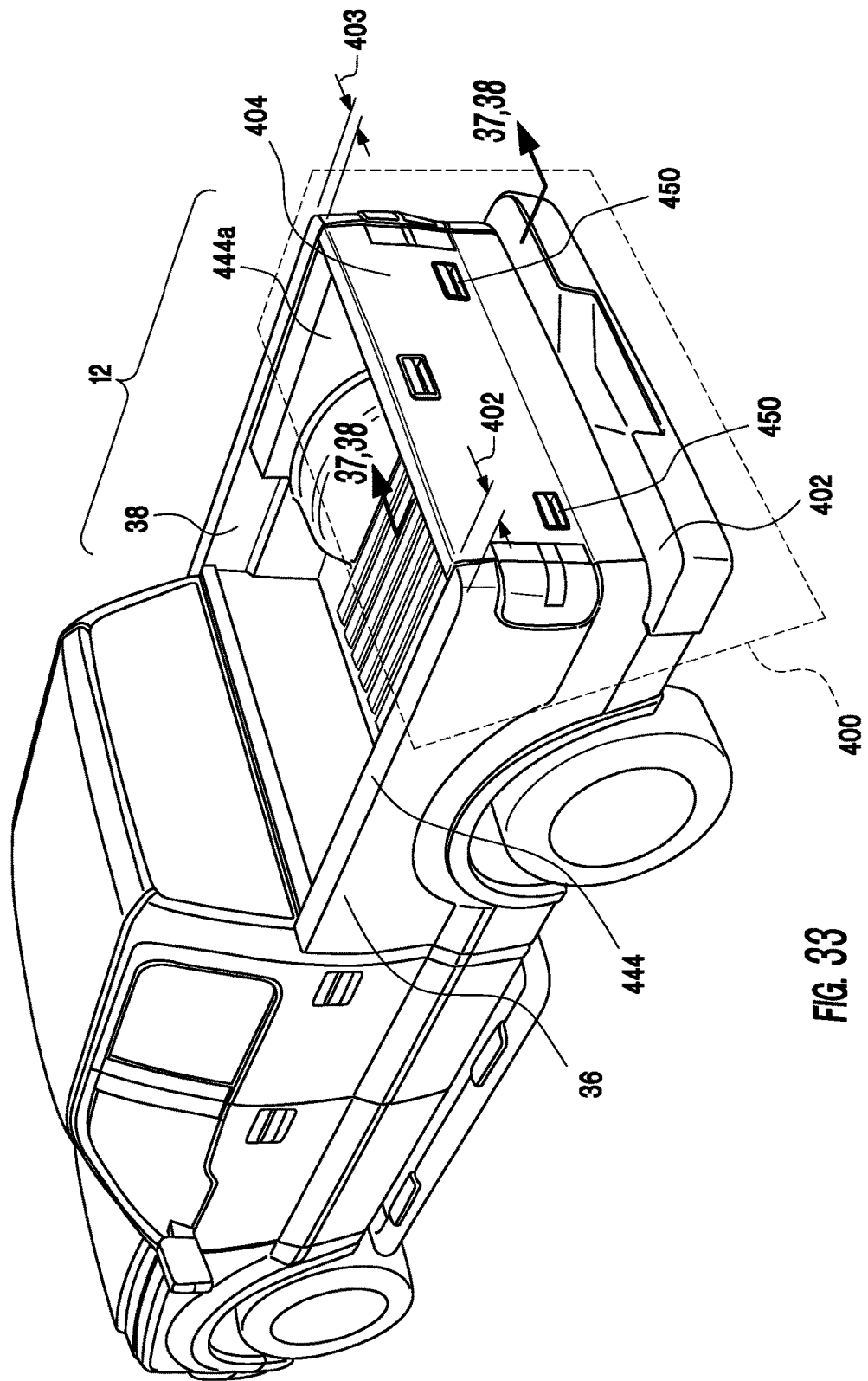
FIG. 33 illustrates a fifth embodiment of the pick up truck elongator.
Figure 34:
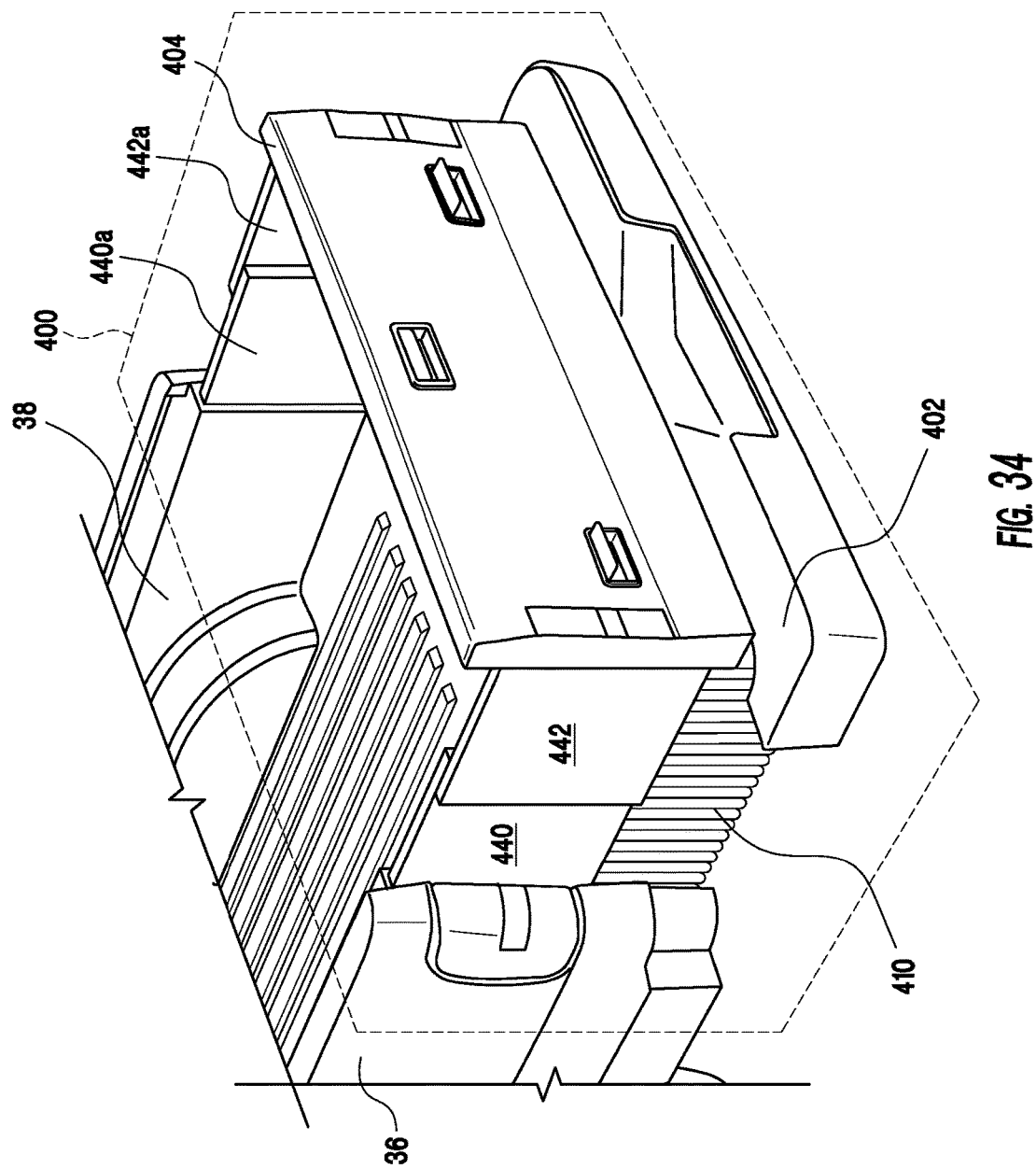
FIG. 34 illustrates the fifth embodiment of the pick up truck elongator with a rear bumper and tailgate extended rearwardly.

Referring now to FIGS. 33-38, a fifth embodiment of the elongator 400 is shown. The elongator 400 may be traversed between a closed position as shown in FIG. 33 and an extended position as shown in FIG. 34. The elongator may be integrated into the left and right side walls 36, 38 of the truck bed 12. The left and right side walls 36, 38 may be sufficiently thick 403 to contain a plurality of panels or telescoping panels 440, 440a, 442, 442a. The left and right side walls 36, 38 may have an enclosure 444, 444a. The enclosures 444, 444a may provide a watertight environment in which the panels 440, 440a, 442, 442a may reside when the elongator 400 is in the closed position, as shown in FIG. 33. It is contemplated that the panels 440, 440a, 442, 442a may define a height that is about equal to a height of the tailgate so that upper edges of the panels 440, 440a, 442, 442a are at about the same height as the upper edge of the tailgate 404 when the tailgate is in the upright position. The panels 440, 440a, 442, 442a form an enclosure that extends from the truck bed to the tailgate in order to keep objects within the truck bed when the elongator 400 is traversed to the extended position. The elongator 400 may be operative to extend a total length of the truck bed by 1-4 feet, and preferably 2 feet.

In the embodiment shown in FIGS. 28-32, the rear bumper 402 is stationary with respect to the left and right side walls 36, 38. However, in the embodiment shown in FIGS. 33-38, the rear bumper 402 is fixed in relation to the tailgate 404 and moves away from the left and right side walls 36, 38 of the truck bed 12 as the elongator 400 is traversed to the extended position. In the extended position, the rear bumper 402 moves away from the left and right side walls 36, 38. Moreover, a floor 408 of the truck bed 12 may also telescope in order to fill any gap between the back edge of the floor 406 of the truck bed 12 when the elongator 400 is in the closed position and the tailgate 404 when the elongator 400 is in the extended position. The floor 408 which extends is shown partially in FIG. 35 and FIG. 36. When the elongator 400 is traversed between the closed and the extended positions, the telescoping floor 408, the bumper 402 and the tailgate 404 are traversed as a group between the closed position and the extended position. Additionally, the telescoping panels 440, 440a, 442, 442a may also be traversed as a group along with the telescoping floor 408, the bumper 402 and the tailgate 404 between the closed and extended positions.

Additionally, there may be an optional skirt 410 which extends with the rear bumper 402 and the tailgate 404 when the elongator 400 is traversed to the extended position. The skirt 410 may be located on both the left and right sides of the elongator 400 and be designed to hide the shocks and/or hydraulic actuators 412.

Referring now the FIGS. 35-38, an underside of the floor 406 and the extending floor 408 is shown. The elongator 400 may have a plurality of shock absorbers 412 and one or more hydraulic actuators 414. In the elongator 400, one hydraulic actuator 414 may be disposed centrally from the left side wall 36 to the right side wall 38. Additionally, two shock absorbers 412 are also shown which are evenly spaced apart from the left side wall 36 to the right side wall 38. The shock absorbers 412 and the hydraulic actuator 414 may be utilized in order to extend the tailgate 404 and the rear bumper 402 from the closed position to the extended position and vice versa. The traversal of the tailgate 404 and the rear bumper 402 may be accomplished with the hydraulic actuator 414. The hydraulic actuator 414 may be controlled with a button located in a cab of the truck or somewhere on the left and right side walls 36, 38 of the truck bed. The button may be the switch disclosed below. Additionally, the button or switch may be a handle 450 formed in the tailgate 404. The handles 450 may be on either side of a midline of the tailgate 404 and operative to release a latch so that the elongator may be traversed from the retracted position to the extended position. The latch may be a lock that holds the elongator in the retracted positions. The handles 450 may be lifted up and the user may pull on the handles 450. By pulling on the handles or lifting up on the handle(s) 450, the user may physically pull the elongator 400 to the extended position. Also, it is contemplated that the actuators 414 may be activated through manipulation (i.e., lifting or pulling) of the handles 450 in order to cause the actuators 414 to traverse the elongator to the extended position. There may also be force sensors to stop traversal of the elongator 400 in the event that an object is blocking the tailgate 404 and/or the rear bumper 402. For example, if a child is located behind the truck, the force sensor may sense the child and prohibit traversal of the elongator 400.

Although the actuator 414 has been described as being a hydraulic actuator, it is also contemplated that the actuator 414 may be an electromechanical actuator. In particular, the rack 372, stepper motor 378 and control panel 380 shown in FIG. 32 may be implemented in the embodiment shown in FIGS. 35-38.

The actuator 414 may comprise one or more actuators 414. The actuator 414 may be attached to the stationary floor 406 and the extending floor 408. By way of example and not limitation, the actuators 414 may be directly secured to the stationary floor 406 or indirectly connected to the stationary floor 406 by way of the frame of the truck and other components of the truck that are in relative fixed position with respect to the stationary floor 406. Moreover, the actuators 414 may be directly secured to the extending floor 408 or indirectly connected to the extending floor 408 by way of the bumper 402. In particular, the actuators 414 may be secured to the extending floor 408 with a bracket or an intermediary part that is connected to the bumper.

Figure 35:
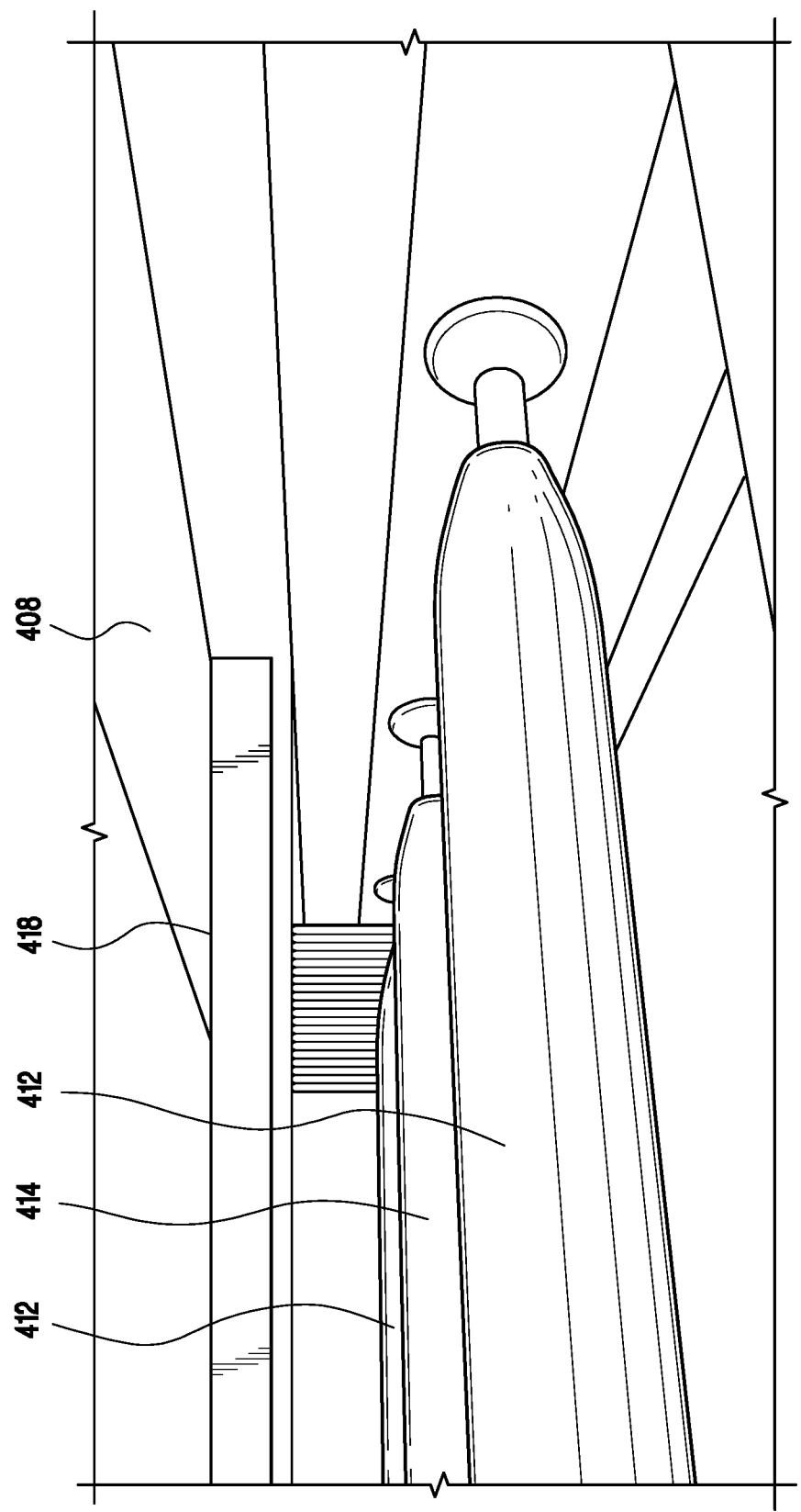
FIG. 35 illustrates one or more actuators and/or shock absorbers for extending the rear bumper and the tailgate rearwardly and also for absorbing impact on the rear bumper.
Figure 36:
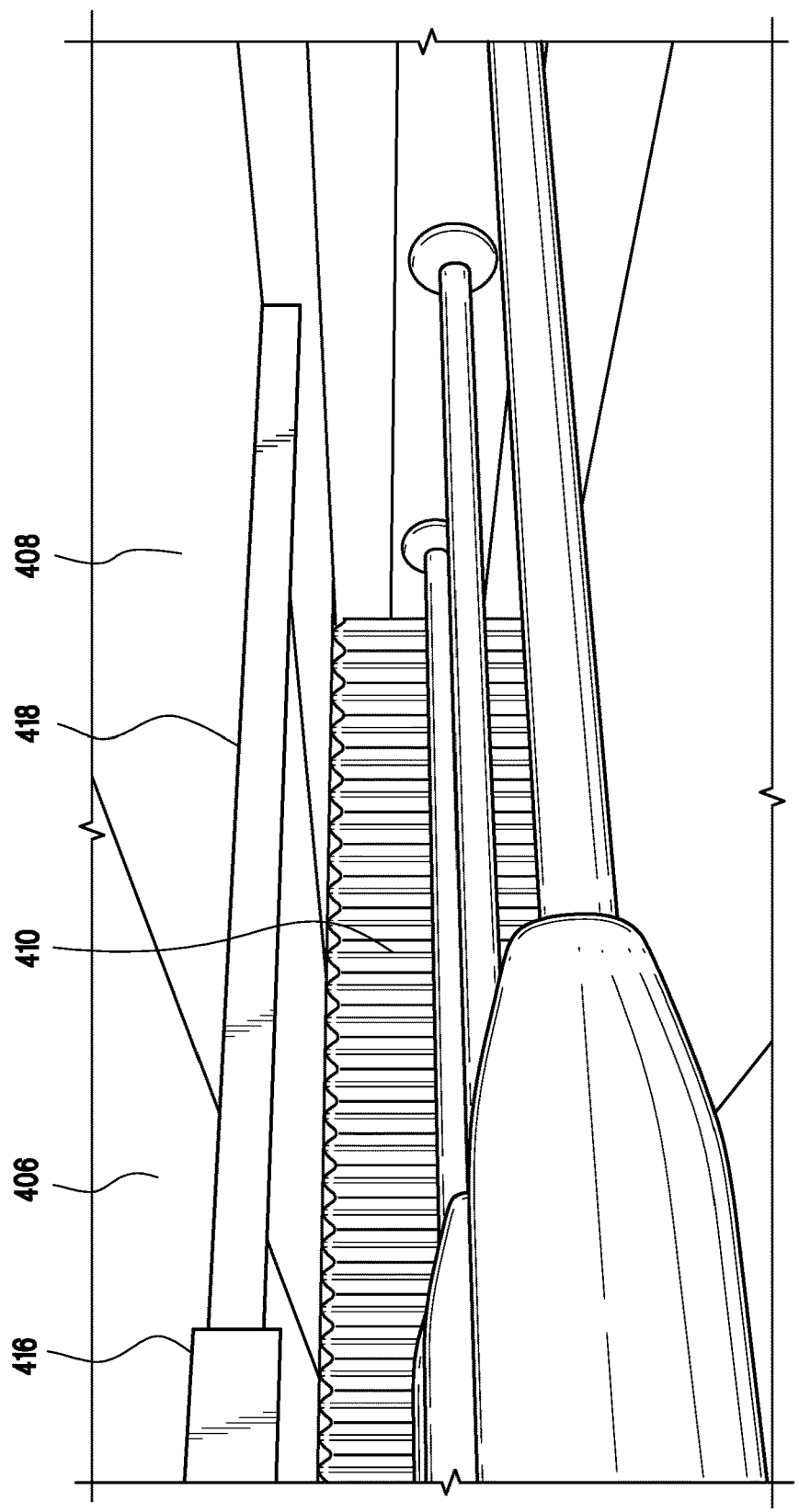
FIG. 36 illustrates the one or more actuators and/or shock absorbers in an extended position.
Figure 37:
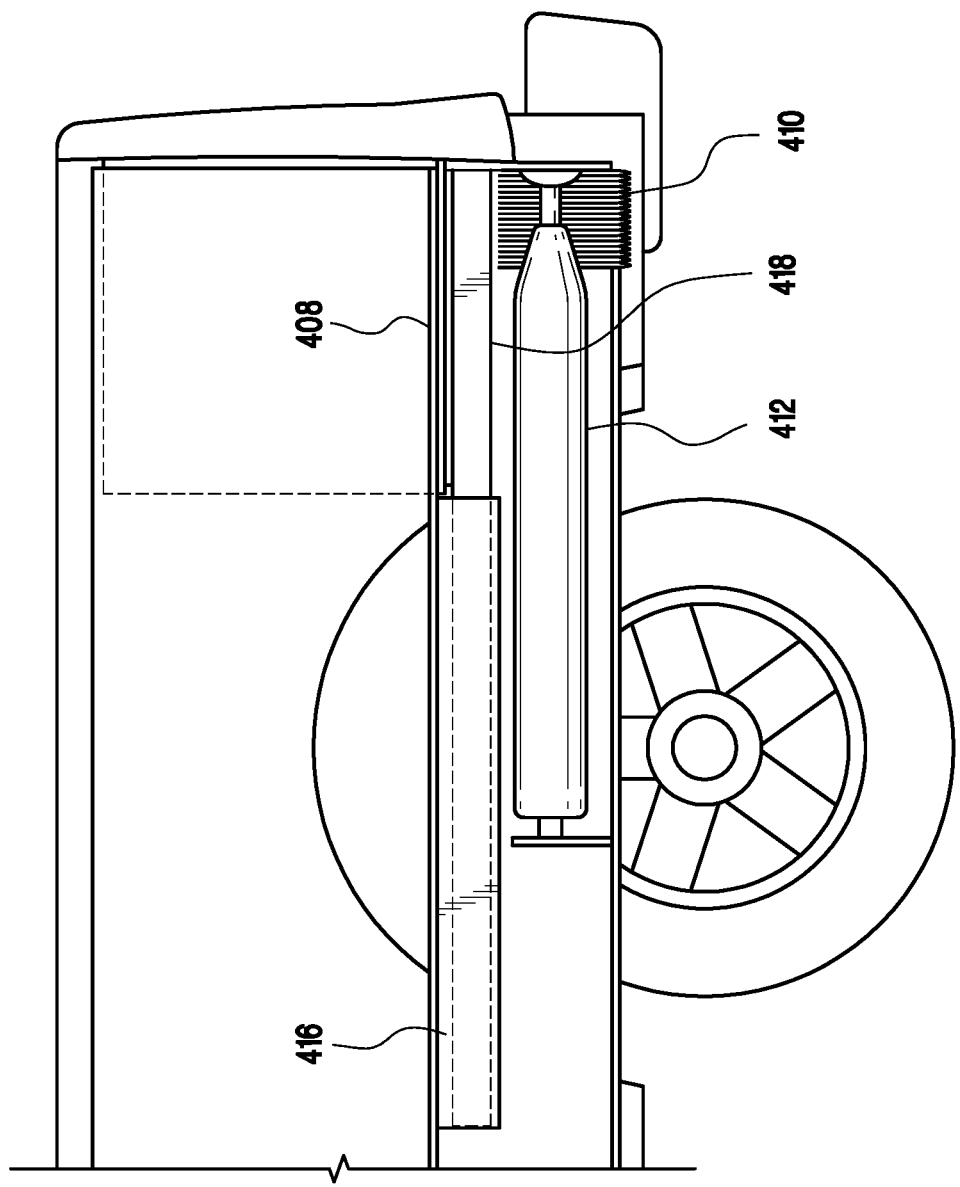
FIG. 37 is a cross sectional view of the truck bed in a collapsed position.
Figure 38:
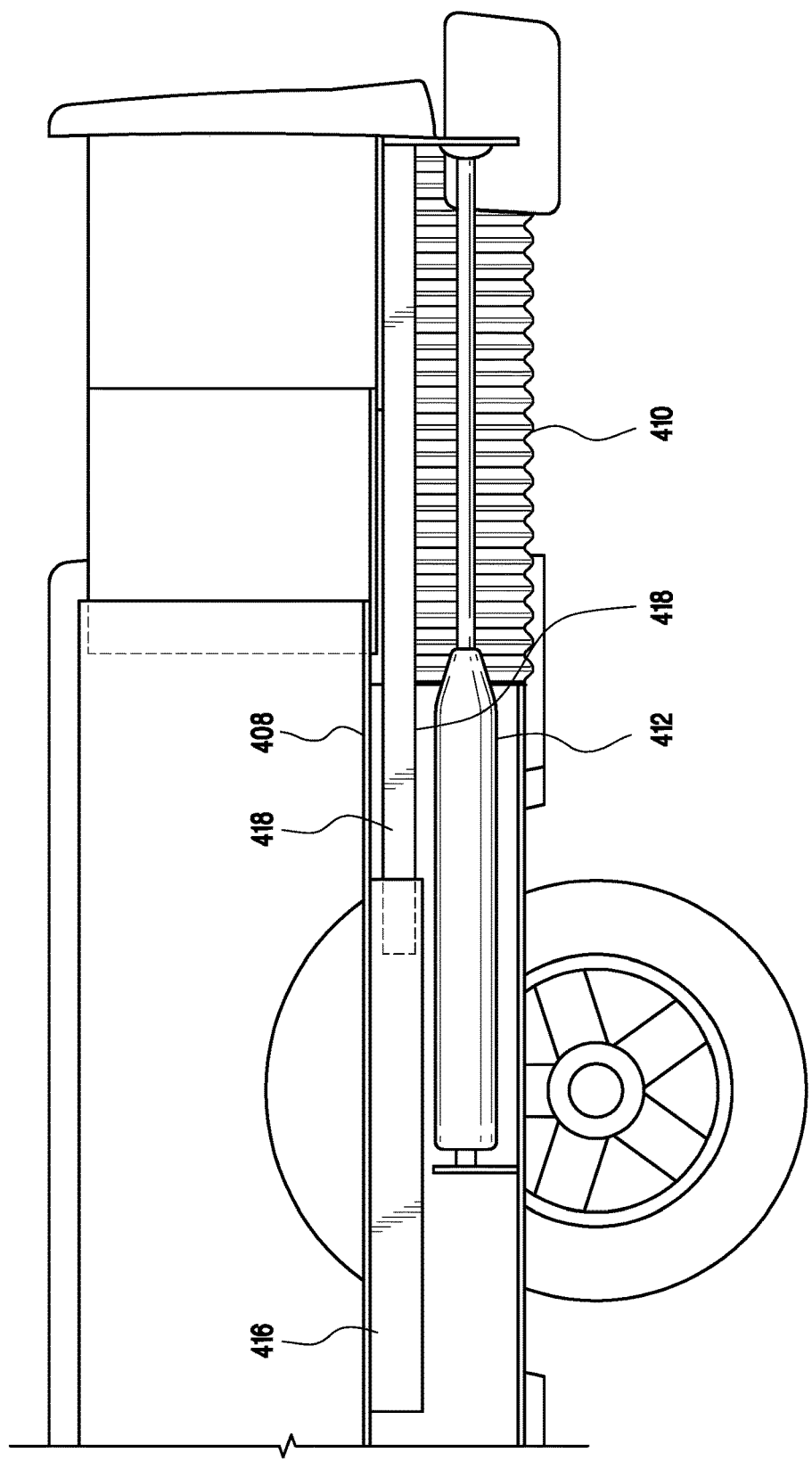
FIG. 38 is the cross sectional view of the truck bed but in an extended position.

FIGS. 35 and 37 illustrate the elongator 400 when the elongator is in the closed position. In contrast, FIGS. 36 and 38 illustrate the elongator 400 when the elongator 400 is in the extended position. In the closed position, the extending floor 408 is disposed under the floor 406 of the truck bed. However, when the elongator 400 is in the extended position, the extending floor 408 extends out past the rear edge of the floor 406 so that people can support objects within the enlarged truck bed 12. The extending floor 408 may ride on rails on left and right sides of the extending floor 408. Because the extending floor 408 may be disposed under the floor 406 of the truck bed, it is contemplated that the extending floor 408 may traverse from the retracted position to the extended position and when in the extended position, the extending floor may rise up so that an upper surface of the extending floor 408 may be in the same plane with the upper surface of the stationary floor 406. Moreover, the movement of the extending floor 408 may be parallel with the upper surface of the stationary floor 406.

When the actuator 414 extends the tailgate 404 and the rear bumper 402 to the extended position, the actuator 414 may be disabled so that any impact force experienced by the rear bumper 402 or the tailgate 404 by another vehicle that rear ends the elongator 400 is not resisted by the hydraulic actuator 414. Rather, the hydraulic actuator 414 may be able to freely move in and out. Also, it is the shock absorbers 412 when in the extended position, as shown in FIG. 36 which may provide impact resistance when the rear bumper 402 and the tailgate 404 experiences an impact force such as when the automobile is rear ended. The shock absorbers 412 may be sized to withstand a 5 mile per hour impact force from a second vehicle hitting the truck from the rear end.

The underside of the floor 406 and the extending floor 408 may have a telescoping support structure. The telescoping support structure may comprise a tube 416 and a sliding extension 418. When the elongator 400 is in the closed position, the sliding extension 418 is disposed more deeply within the tube 416. However, when the elongator 400 is in the extended position, the sliding extension 418 may extend outward and provides support to the floor 408 so that heavy objects within the truck bed or the enlarged truck bed do not cause the extending floor 408 to slide or bend downward. The sliding extension 418 and the tube 416 may be sufficiently rigid in order to provide enough support to the elongator 400. Moreover, the tube 416 may be fixedly secured to floor 406 or other frame member of the truck and the sliding extension 418 may be fixedly secured to the extending floor 408 or some other member that is attached to the extending floor 408 in order to provide the support necessary in order to hold objects on top of the extending floor 408 when the elongator is in the extended position.

The telescoping support structure may be retrofitted with a strain gage in order to measure the weight supported by the elongator 400 in the truck bed. The strain gage may be connected to a red and green light emitting diode (i.e., indicator) that emits a green light when the amount of weight supported by the elongator 400 is within its design weight and emits a red light when the weight supported by the elongator 400 exceeds the weight limitations of the elongator 400. The gage may be placed on the truck bed at the stationary portion of the truck bed or at the traversable part of the truck bed that forms the elongator 400. Additionally or alternatively, the indicator may be placed in the truck cab in order to notify the driver of times when the road conditions (e.g., bumpy road conditions) may be causing temporary excessive stresses on the elongator 400 which may require the driver to stop to lower stresses experienced by the elongator 400 or which may require the driver to slow the vehicle to an appropriate speed.

The elongator 400 may be integrated into the truck from the factory or may be a retrofit onto existing trucks that do not have the elongator 400. In this regard, the elongator 400 is capable of providing additional capabilities to those trucks that are already in the market and also for future trucks to be sold.

The above description is given by way of example, and not limitation. Given the above disclosure, one skilled in the art could devise variations may be within the scope and spirit of the invention disclosed herein, including various ways of securing the panels to the factory receiver of the factory tailgate of the truck bed. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A tailgate extender of a bed of a truck, the tailgate extender comprising:
   one or more floor extension panels, disposed adjacent to a floor of the bed, that extend the floor of the bed as a tailgate of the truck is moved backwards;
   one or more driver-side panels that are traversed to an extended position as the tailgate is moved backwards, the one or more driver-side panels disposed interior to an exterior surface of the driver-side wall;
   one or more passenger-side panels that are traversed to an extended position as the tailgate is moved backwards, the one or more passenger-side panels disposed interior to an exterior surface of the passenger-side wall; and
   a rear bumper that remains stationary relative to a cab of the truck as the tailgate is moved backwards such that the rear bumper is disposed at a middle portion of the extended floor, the rear bumper having a width that is greater than a width of the tailgate so that the bumper protrudes laterally sideways past the one or more driver-side panels and the one or more passenger-side panels.

2. The tailgate extender of claim 1, wherein the one or more floor extension panels are disposed below the floor of the bed.

3. The tailgate extender of claim 1, further comprising primary taillights on the driver-side wall and the passenger-side wall that remain stationary relative to the truck as the tailgate is moved backwards.

4. The tailgate extender of claim 1, further comprising:
   one or more support structures attached to the bed that extend and retract as the bed is extended and retracted by the one or more floor extension panels, the one or more driver-side panels, and the one or more passenger-side panels;
   a motor that extends and retracts the one or more support structures as the bed is extended and retracted by the one or more floor extension panels, the one or more driver-side panels, and the one or more passenger-side panels; and
   a controller that a user can engage to control the motor to extend and retract the one or more support structures.

5. The tailgate extender of claim 4, wherein the controller comprises a button, switch, or electronic panel.

6. The tailgate extender of claim 4, wherein the controller comprises a handle or switch disposed on the tailgate.

7. A tailgate extender of a bed of a truck, the tailgate extender comprising:
   one or more floor extension panels, disposed adjacent to a floor of the bed. that extend a floor of the bed as a tailgate of the truck is moved backwards;

one or more support structures attached to the bed that extend and retract as the tailgate is moved backwards and forwards;

a motor that extends and retracts the one or more support structures as the tailgate is moved backwards and forwards; and a controller disposed on the tailgate that a user can engage to control the motor to extend and retract the one or more support structures.

8. The tailgate extender of claim 7, wherein the controller comprises a button, switch, or electronic panel.

9. The tailgate extender of claim 7, wherein the controller comprises a handle or switch.

10. The tailgate extender of claim 7, further comprising primary taillights disposed on the tailgate and electrically connected to an electrical system of the truck, wherein the primary taillights are aesthetically blended with side taillights on a driver-side wall of the bed and a passenger-side wall of the bed so as to appear integral with the side taillights when the bed is in a fully retracted position.

* * * * *